US011465697B2

(12) United States Patent
Stegawski et al.

(10) Patent No.: US 11,465,697 B2
(45) Date of Patent: Oct. 11, 2022

(54) MOUNTING ASSEMBLY FOR MOVABLE FAIRING

(71) Applicant: PACCAR Inc, Bellevue, WA (US)

(72) Inventors: Piotr Stegawski, Kirkland, WA (US); Jeffrey Bobrowski, Seattle, WA (US)

(73) Assignee: PACCAR Inc, Bellevue, WA (US)

( * ) Notice: Subject to any disclaimer, the term of this patent is extended or adjusted under 35 U.S.C. 154(b) by 528 days.

(21) Appl. No.: 16/554,403

(22) Filed: Aug. 28, 2019

(65) Prior Publication Data

US 2021/0061371 A1      Mar. 4, 2021

(51) Int. Cl.
    *B62D 35/00*     (2006.01)
    *B23Q 1/25*      (2006.01)
    *B62D 65/02*     (2006.01)

(52) U.S. Cl.
    CPC .............. *B62D 35/00* (2013.01); *B23Q 1/25* (2013.01); *B62D 65/026* (2013.01)

(58) Field of Classification Search
    CPC ......... B62D 35/00; B62D 65/026; B23Q 1/25
    See application file for complete search history.

(56) References Cited

U.S. PATENT DOCUMENTS

| 5,487,586 A | 1/1996 | Kinkaide |
| 7,641,262 B2 | 1/2010 | Nusbaum |
| 7,789,412 B2 | 9/2010 | Algüera |
| 9,663,156 B2 | 5/2017 | Breidenbach |
| 9,845,118 B2 | 12/2017 | Dieckmann et al. |
| 2015/0321706 A1* | 11/2015 | Smith .................... B62D 37/02 296/180.2 |

FOREIGN PATENT DOCUMENTS

| BE | 845298 A | 12/1976 |
| EP | 3 079 976 A1 | 10/2016 |
| GB | 1 528 108 A | 10/1978 |
| WO | 2015/086120 A1 | 6/2015 |

* cited by examiner

*Primary Examiner* — Lori L Lyjak
(74) *Attorney, Agent, or Firm* — Seed IP Law Group LLP

(57) ABSTRACT

The disclosed technology relates to a moveable panel, such as a fairing, of a vehicle, such as a semi-truck. For a number of reasons, it may be desirable to gain access to the area behind the fairing, for example, to access batteries, air/gas tanks, auxiliary power units, and/or other components that are mounted to the vehicle frame. In order to move the fairing with respect to the vehicle frame, one or more examples of a mounting system are provided that enables the fairing to pivot/swing away from the vehicle frame in a first direction (e.g., forward toward the front wheel). In some embodiments, the fairing may also pivot/swing away from the frame in a second direction (e.g., rearward toward the rear wheels) opposite the first direction. This multiple pivoting/swinging movement of the fairing enables access to different locations behind the fairing.

20 Claims, 18 Drawing Sheets

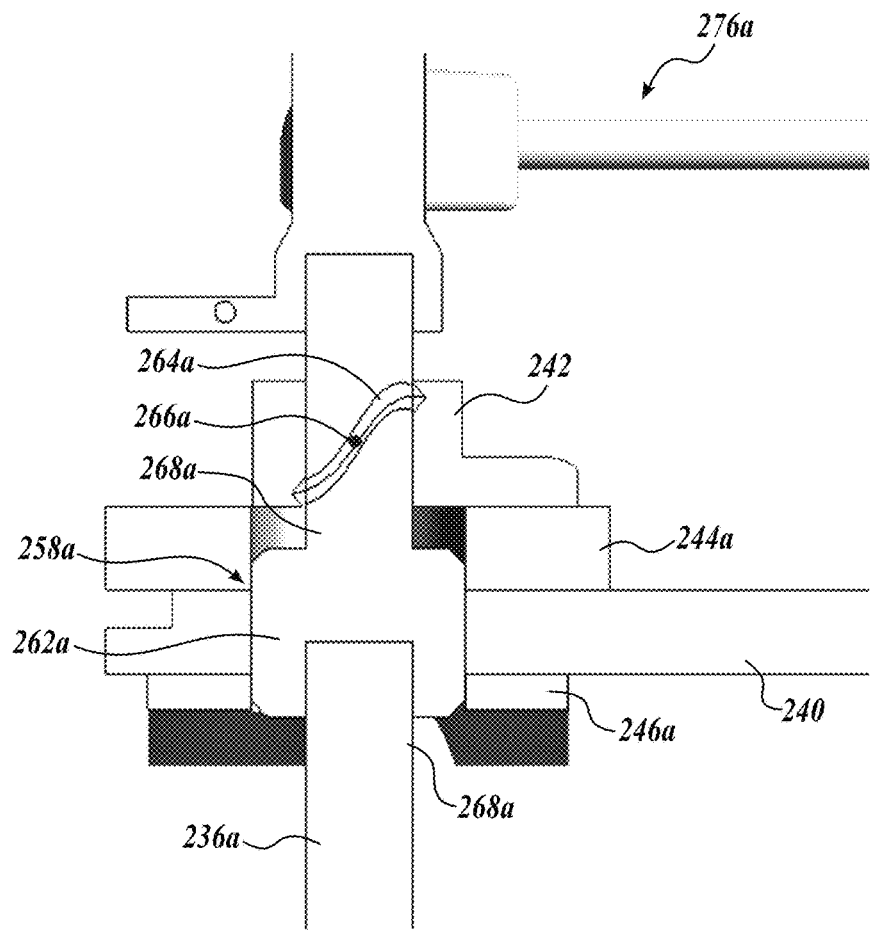
FIG. 7C
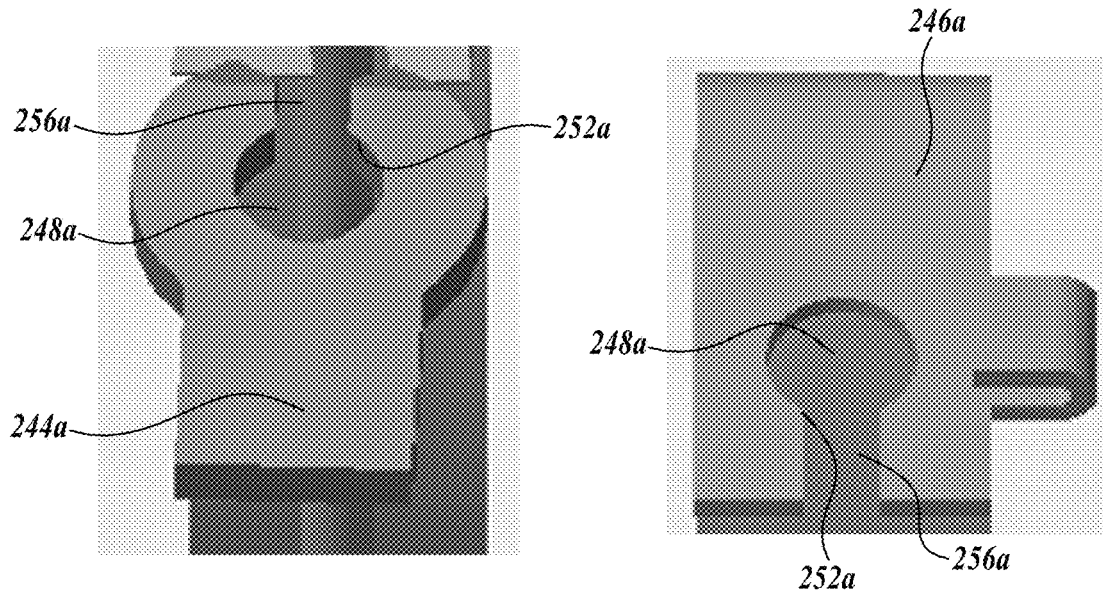
FIG. 7D  FIG. 7E

MOUNTING ASSEMBLY FOR MOVABLE FAIRING

FIELD OF THE DISCLOSURE

Embodiments of the present disclosure relate to selective movement of a panel with respect to another panel, compartment, frame, or the like. Embodiments of the present disclosure further relate to mounting systems that permit movement of the panel, such as a fairing, in a swinging motion about two fixed pivots.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present disclosure, a vehicle panel mounting assembly is provided. In an embodiment, the assembly comprises a panel and a mounting system configured to mount the panel on a stationary part of a vehicle. The mounting system includes a first mount mounted on the panel, a second mount configured to be mounted on the stationary part, and at least one support member interconnecting the first mount and the second mount. In some embodiments, the mounting system is configured to support the panel in a stationary manner and to permit movement of the panel simultaneously in two perpendicular directions with respect to the stationary part.

In an embodiment of the assembly, movement of the panel simultaneously in two perpendicular directions with respect to the stationary part is selected from a group of movements consisting of:

forwardly in a longitudinal direction of the vehicle and outwardly in a lateral direction of the vehicle;

rearwardly in a longitudinal direction of the vehicle and outwardly in a lateral direction of the vehicle; and forwardly in a longitudinal direction of the vehicle and outwardly in a lateral direction of the vehicle and rearwardly in a longitudinal direction of the vehicle and outwardly in a lateral direction of the vehicle.

In accordance with another embodiment, the assembly may further comprise an actuator movable between a first actuator position, in which the fairing is unlatched and is permitted to swing away from the stationary part in a clockwise motion, and a second actuator position, in which the fairing is unlatched and is permitted to swing away from the stationary part in a counter-clockwise motion. In an embodiment, the actuator has a neutral position in-between the first and section actuator positions, in which the fairing is latched so as to not be permitted to swing away from the stationary part.

In an embodiment of the assembly, the actuator includes a handle lever that moves within a track formed in a mounted retainer. In an embodiment, the track defines first and second end notches and a central notch disposed in-between the first and second notches, wherein the handle lever is: (1) contained by the first notch in the first actuator position; (2) contained by the second notch in the second actuator position; and (3) contained by the central notch in the neutral position.

In an embodiment of the assembly, the mounting system includes a set of latches, each latch having a latched state and an unlatched state. In this or other embodiments, the assembly further comprises an actuator configured to actuate a subset of the latches from the latched state of the subset of latches to the unlatched state of the subset of latches, the remaining latches of the set of latches maintained in the latched state so as to permit the fairing to swing away from the stationary part.

In an embodiment of the assembly, the mounting system includes first and second pairs of vertical bars that define first and second pairs of pivot axes, respectively. In this or other embodiments, the mounting system is configured to: (1) permit movement of the panel with respect the stationary part about the first pivot axes for movement forwardly in a longitudinal direction of the vehicle and outwardly in a lateral direction of the vehicle; or (2) permit movement of the panel with respect the stationary part about the second pivot axes for movement rearwardly in a longitudinal direction of the vehicle and outwardly in a lateral direction of the vehicle.

In an embodiment of the assembly, the first mount includes a set of four panel mount latches, each configured to: (1) latch onto a respective one of the vertical bars and pivot relative to the respective one of the vertical bars; and (2) unlatch from the respective one of the vertical bars so as to be separable from the respective one of the vertical bars.

In this or other embodiments, the second mount includes a set of four stationary part mount latches, each configured to: (1) latch onto a respective one of the vertical bars and pivot relative to the respective one of the vertical bars; and (2) unlatch from the respective one of the vertical bars so as to be separable from the respective one of the second bars.

In this or other embodiments, the mounting assembly further comprises an actuator configured to selectively latch two of the panel mount latches about the first or second pair of vertical bars to form a pair of fixed pivots, to selectively latch two of the second part mount latches about the other of the first or second pair of vertical bars to form a second pair of movable pivots, and configured to selectively unlatch the remaining two panel mount latches and the remaining two stationary part mount latches.

In accordance with another embodiment, the mounting system includes means for permitting movement of the panel about a first pair of fixed pivots associated with the stationary part in a first operational state and for permitting movement of the panel about a second pair of fixed pivots associated with the stationary part in a second operational state.

In this or other embodiments, the assembly comprising means for selecting the first operational state or the second operational state such that the panel is able to swing away from the stationary part about the first pair of fixed pivots or able to swing away from the stationary part about the second pair of fixed pivots dependent on the selected operational state.

In an embodiment of the assembly, the first mount includes a plurality of spaced apart mounting members each configured to be mounted on the panel and including a circular recess connected to a slotted opening.

In this or other embodiments, the second mount includes a plurality of spaced apart mounting members each configured to be mounted on the stationary part and including a circular recess connected to a slotted opening.

In this or other embodiments, the assembly further comprises linkage interconnecting the first mount and the second mount, the linkage including first and second pairs of bars and at least one support arm interconnecting the bars of the first and second pairs of bars, the first and second pairs of bars having first portions thereof that are dimensioned to be received into the circular recess through the slotted openings of the mounting members of the first and second mounts and second portions that are prohibited from movement through the slotted openings of the mounting members.

In accordance with another embodiment, the assembly further comprises an actuator configured to selectively unlatch the mounting members of the first and second mounts that are associated with first bars of the first and second pairs of bars by alignment of the first portions with the slotted openings, wherein the panel is permitted to swing away from the stationary part about the second bars of the first and second pairs of bars.

In an embodiment of the assembly, rotation of the actuator selectively unlatches the mounting members of the first and second mounts that are associated with first bars of the first and second pairs of bars.

In an embodiment of the assembly, the first mount includes a plurality of spaced apart mounting members each configured to be mounted on the panel and including a circular recess connected to a slotted opening.

In this or other embodiments, the second mount includes a plurality of spaced apart mounting members each configured to be mounted on the stationary part and including a circular recess connected to a slotted opening.

In this or other embodiments, the mounting assembly further comprises linkage interconnecting the first mount and the second mount, the linkage including first and second pairs of bars and at least one support arm interconnecting the bars of the first and second pairs of bars, each bar of the first and second pairs of bars having first and second spaced apart cams dimensioned to be received into the circular recess through the slotted openings in a first orientation and prohibited from movement through the slotted openings of the mounting members in a second orientation.

In accordance with another aspect of the present disclosure, a panel mounting system is provided. In an embodiment, system comprises a panel mount that includes a plurality of panel mount latches configured to be mounted on a panel, a stationary part mount that includes a plurality of stationary part mount latches configured to be mounted on a stationary part, and linkage interconnecting the panel mount and the stationary part mount. The linkage in an embodiment includes first and second pairs of bars defining first and second pivot axes and at least one swing arm interconnecting the bars of the first and second pairs of bars. The system also includes an actuator configured to selectively latch two of the panel mount latches about the second pair of bars to form a first pair of movable pivots and selectively latch two of the stationary part mount latches about the first pair of bars to form a first pair of fixed pivots, and configured to selectively unlatch the remaining mount latches. The panel is permitted to swing away from the stationary part about the fixed pivots.

In an embodiment of the system, each latch includes a first latch interface for ensuring latch closure and a second latch interface that releases the latch.

In an embodiment of the system, the actuator is configured to: selectively latch a different two of the panel mount latches about the first pair of vertical bars to form a second pair of movable pivots and selectively latch a different two of the stationary part mount latches about the second pair of vertical bars to form a second pair of fixed pivots; and selectively unlatch the remaining mount latches. The panel is permitted to swing away from the stationary part about the second pair of fixed pivots.

In accordance with another aspect of the present disclosure, a vehicle is provided. The vehicle comprises a first fairing supported by a vehicle frame, a second fairing positioned adjacent the first fairing, and a second fairing mounting system. In an embodiment, the mounting system includes a first mount mounted on the second fairing, a second mount mounted to the vehicle frame, and at least one swing arm interconnecting the first mount and the second mount. The mounting system in an embodiment is configured to support the second fairing in a stationary position with respect to the first fairing, to permit movement of the second fairing simultaneously in both a forwardly direction and a laterally outwardly direction with respect to the first fairing, and to permit movement of the second fairing simultaneously in both a rearwardly direction and a laterally outwardly direction with respect to the first fairing. In an embodiment, the vehicle also includes an actuator having a fairing latched position and first and second fairing unlatched positions.

In an embodiment of the vehicle, the mounting system includes first and second pairs of vertical bars that define first and second sets of pivots. In an embodiment, the mounting system is configured to: (1) permit movement of the second fairing with respect to the vehicle frame about the first pivot axes for movement forwardly in a longitudinal direction of the vehicle frame and outwardly in a lateral direction of the vehicle frame; or (2) permit movement of the second fairing with respect to the vehicle frame about the second pivot axes for movement rearwardly in a longitudinal direction of the vehicle frame and outwardly in a lateral direction of the vehicle frame.

In this or other embodiments, the first mount includes a set of four first mount latches, each first mount latch mounted to the second fairing and configured to: (1) latch onto a respective one of the vertical bars and pivot relative to the respective one of the vertical bars; and (2) unlatch from the respective one of the vertical bars so as to be separable from the respective one of the vertical bars.

In this or other embodiments, the second mount includes a set of four second mount latches, each second mount latch configured to be mounted to the stationary part and configured to: (1) latch onto a respective one of the vertical bars and pivot relative to the respective one of the vertical bars; and (2) unlatch from the respective one of the vertical bars so as to be separable from the respective one of the second bars.

In an embodiment of the vehicle, the mounting system includes means for permitting movement of the second fairing about a first pair of fixed pivots in a first operational state and for permitting movement of the second fairing about a second pair of fixed pivots in a second operational state.

In an embodiment of the vehicle, the first and second fairing unlatched positions correspond to the first and second operational states, respectively, such that the second fairing is able to pivot about the first pair of fixed pivots or able to pivot about the second pair of fixed pivots dependent on the selected operational state.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIGS. 1B and 1C depict the fairing mounting assembly shown in FIG. 1A moving towards a first deployed position, wherein FIG. 1C depicts the fairing in the first deployed position, and FIG. 1B depicts the fairing in-between the closed position and the first deployed position;

FIGS. 1D and 1E depict the fairing mounting assembly shown in FIG. 1A moving towards a second deployed position, wherein FIG. 1E depicts the fairing in the second deployed position, and FIG. 1D depicts the fairing in-between the closed position and the second deployed position;

FIGS. 7A-7G illustrate another representative embodiment of a mounting system in accordance with the present disclosure;

DETAILED DESCRIPTION

Figure 1A:
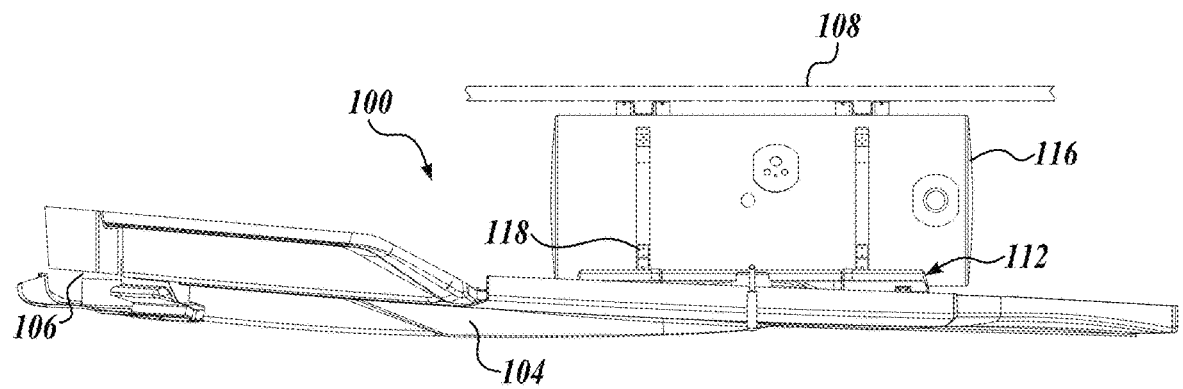
FIG. 1A is a top view of one representative embodiment of a fairing mounting assembly in accordance with the present disclosure, wherein the fairing in a closed position.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Generally described, the disclosed technology relates to a moveable panel, such as a fairing, of a vehicle, such as a semi-truck. For a number of reasons, it may be desirable to gain access to the area behind the fairing, for example, to access batteries, air/gas tanks, auxiliary power units, and/or other components that are mounted to the vehicle frame. In order to move the fairing with respect to the vehicle frame, one or more examples of a mounting system are provided that enables the fairing to pivot/swing away from the vehicle frame in a first direction (e.g., forward toward the front wheel). In some embodiments, the fairing may also pivot/swing away from the frame in a second direction (e.g., rearward toward the rear wheels) opposite the first direction. This multiple pivoting/swinging movement of the fairing enables access to different locations behind the fairing.

In some embodiments of the present disclosure, the mounting system is configured to maintain parallelism between the fairing and the vehicle as the fairing swings away from the vehicle. In these embodiments, the mounting system, in conjunction with the fairing and the vehicle frame, form a type of four bar linkage referred to as a parallel motion linkage. As such, the mounting system includes two moving pivots associated with the fairing and two fixed pivots associated with the vehicle frame. In operation, the fairing pivots or swings away about the two fixed pivots for providing access behind the fairing. As will be described in more detail below, the mounting system in some embodiments is configured such that the two (2) fixed pivots and two (2) moving pivots of the parallel motion linkage are interchangeable via an actuator such that the fairing can swing away in opposite directions.

For example, embodiments of the mounting system may include first and second pairs of pivots formed by first and second pairs of bars, and a pair of swing/support arms that link the fairing to the frame via the bars. In various embodiments of the present disclosure, latches are employed or otherwise formed between components of the mounting system to latch the fairing in a stationary, closed position. In some embodiments, latches associated with the first pair of bars can be selectively unlatched, allowing the fairing (and the first pair of bars) to swing away from the vehicle frame in a first direction about the second pair of bars, which act as the pair of fixed pivots. In other embodiments, latches associated with the second pair of bars can be selectively unlatched, allowing the fairing (and the second pair of bars) to swing away from the vehicle frame in a second, opposite direction about the first pair of bars, which act as the pair of fixed pivots.

With the disclosed technology installed on a vehicle, such as a semi-truck, an operator can initiate movement of the fairing by manipulating an actuator, such as a handle lever. Manipulation of the handle lever opens or unlatches, for example, a series of releasable latches. Once unlatched, the fairing can swing away from the vehicle so that the operator can access the area behind the fairing. After the operator is finished accessing the area behind the fairing, the operator can swing the fairing back toward the vehicle. Once the fairing is in the closed position, the operator in some embodiments can actuate the handle lever again to close or latch the opened latches, thereby latching the fairing to the vehicle so that the fairing is prohibited from moving with respect to the vehicle. In other embodiments, the latches are configured such that when the operator swings the fairing back to the closed position with a sufficient force the fairing is latched.

Although some embodiments of the present disclosure will be described with reference to a vehicle, such as a semi-truck, one skilled in the relevant art will appreciate that the disclosed embodiments are illustrative in nature, and therefore, should not be construed as limited to applications with a semi-truck. It should therefore be apparent that the techniques and methodologies set forth by one or more representative embodiments of the present disclosure have wide application, and may be used in any situation where access via a movable door, hatch, panel, etc., of a vehicle (e.g., passenger car or truck, medium or heavy truck, RV, watercraft, train, bus, trailer, aircraft, etc.) is desirable. Additionally, although some embodiments of the present disclosure will be described with reference to a fairing for a vehicle, it should be apparent that the techniques and methodologies set forth by one or more representative embodiments of the present disclosure can be employed in any non-vehicle application where access via a door, hatch, panel, etc., may be desirable.

FIGS. 1A-1E illustrate a representative embodiment of an assembly, such as a panel or fairing mounting assembly for a vehicle, generally designated 100. As shown in FIGS. 1A-1E, the assembly 100 includes a fairing 104 that is movable with respect to an adjacent fairing 106 or other stationary vehicle component or part, such as the vehicle frame 108. The assembly 100 also includes a mounting system 112 for permitting movement of the fairing 104 from a first, closed position shown in FIG. 1A to a second, deployed position shown, e.g., in FIG. 1C. In some embodiments, the mounting system 112 permits movement of the fairing 104 to a third, deployed position shown, e.g., in FIG. 1E, which is in the direction opposite of the position shown in FIG. 1C.

Movement of the fairing 104 to one or more deployed positions permits access to one or more areas 114 behind the fairing 104. For example, movement of the fairing may provide access to a tank 116, batteries, auxiliary power units, and/or other components (not shown), mounted to the vehicle frame. Of course, while a fairing is shown in the embodiment of FIGS. 1A-1E, the fairing can instead be a panel, a hatch, a door, or the like for any suitable vehicle or non-vehicle application.

Figure 6:
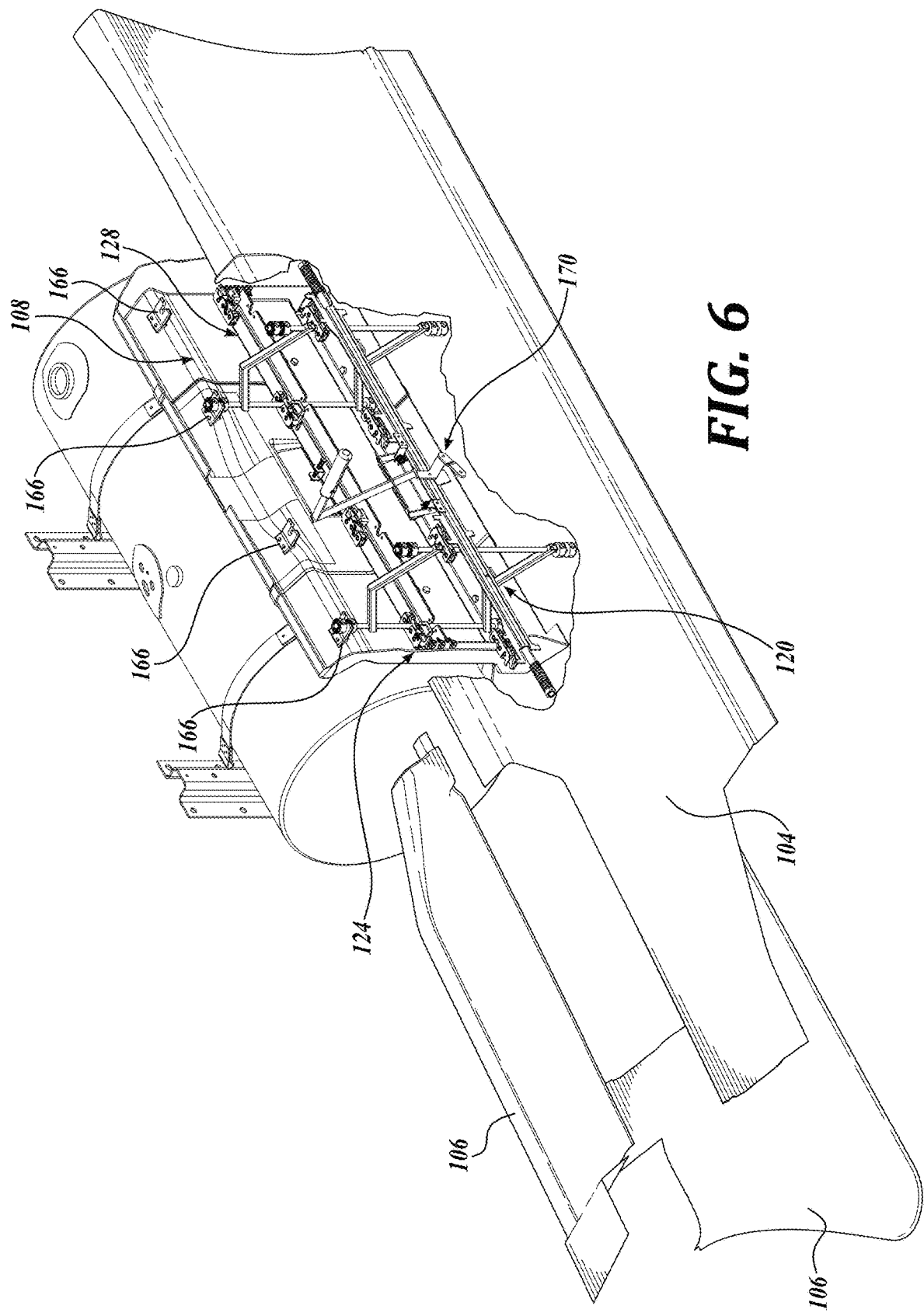
FIG. 6 is a perspective, partial cut-away view of the fairing mounting assembly shown in FIG. 1B.

As briefly described above, the mounting system 112 mounts the fairing 104 to a stationary part of the vehicle in a selectively movable manner. In the embodiment shown, the mounting system 112 mounts the fairing 104 in a selectively moveable manner to the tank 116, which is stationarily mounted to the vehicle frame 108 via hanger brackets 118 or similar structure. In that regard, and referencing the cut-away perspective view of FIG. 6, the mounting system 108 includes a first or fairing mount 120 supported by or affixed to the fairing 104, a second or vehicle mount 124 supported by or affixed to the vehicle, and linkage 128 interconnecting the fairing mount 120 and the vehicle mount 124. In the embodiment shown, the mounting system 112 is configured to both support the fairing in a stationary manner, as shown in FIG. 1A, and to permit swinging movement of the fairing 104 simultaneously in two perpendicular directions with respect to the vehicle frame, to at least the positions shown either FIGS. 1B, 1C or FIGS. 1D, 1E or both. The mounting system 112 in some of these embodiments is configured to lock the fairing 104 in the stationary, closed position.

In some embodiments, the two perpendicular directions include a longitudinal direction of the vehicle and a lateral direction of the vehicle. In some embodiments, the mounting system is configured to permit movement of the vehicle body panel: (1) forwardly in a longitudinal direction of the vehicle and outwardly in a lateral direction of the vehicle; (2) rearwardly in a longitudinal direction of the vehicle and outwardly in a lateral direction of the vehicle; and/or (3) forwardly in a longitudinal direction of the vehicle and outwardly in a lateral direction of the vehicle and rearwardly in a longitudinal direction of the vehicle and outwardly in a lateral direction of the vehicle.

In order to permit swinging movement of the fairing simultaneously in two perpendicular directions with respect to the vehicle frame, the mounting system 112 is arranged to form a parallel motion linkage with the fairing and the vehicle frame. In that regard, referencing FIGS. 2 and 3, the mounting system 112 in some embodiments includes a first pair of pivots defining a first pair of pivot axes 130a, 130c and a second pair of pivots defining a second pair of pivot axes 130b, 130d. As will be described in more detail below, the pairs of pivots form two (2) fixed pivots and two (2) moving pivots, respectively, of the parallel motion linkage, and are interchangeable via an actuator in some embodiments such that the fairing can swing away in opposite directions.

Figure 2:
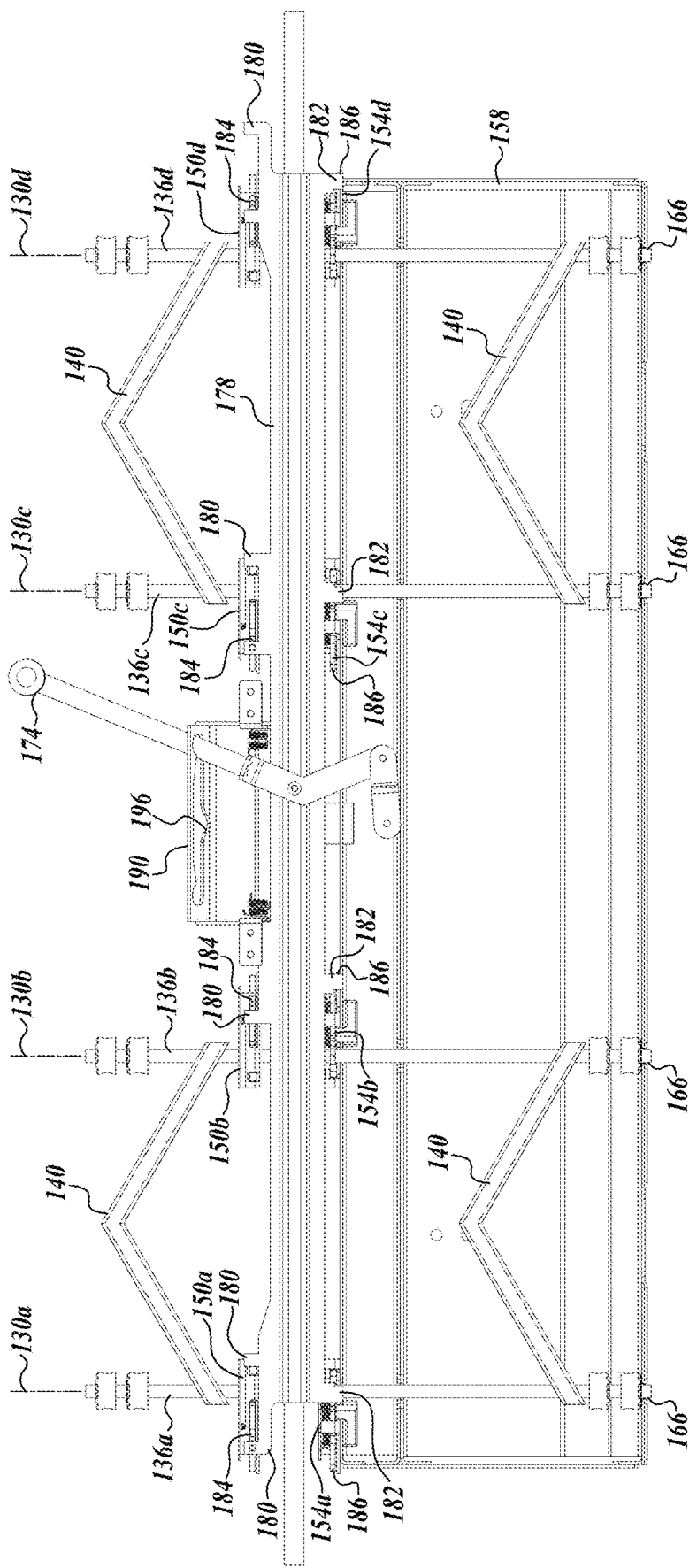
FIG. 2 is a front view of one representative embodiment of a mounting system in accordance with the present disclosure.
Figure 3:
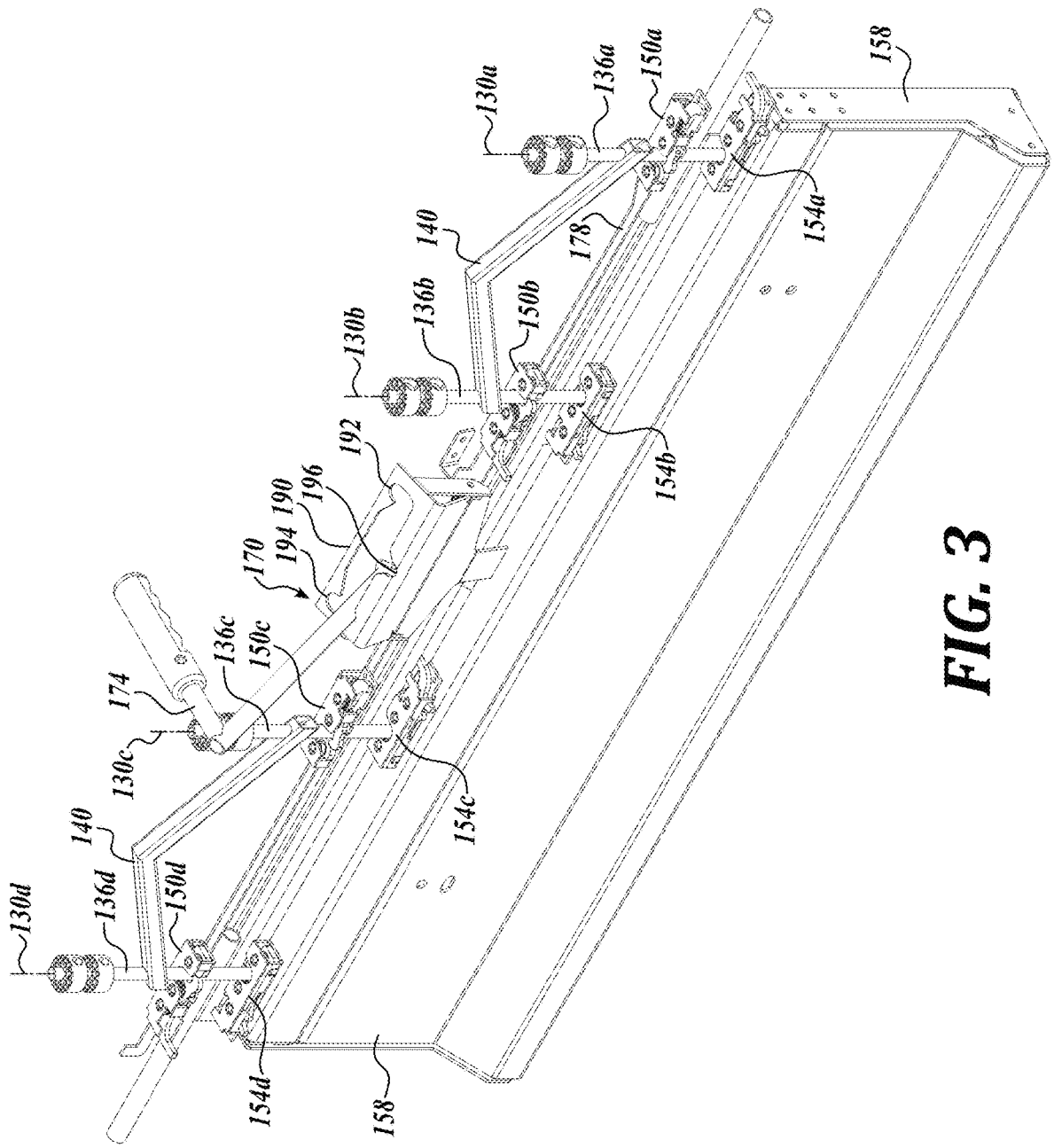
FIG. 3 is rear perspective view of the mounting system shown in FIG. 2.
Figure 4A:
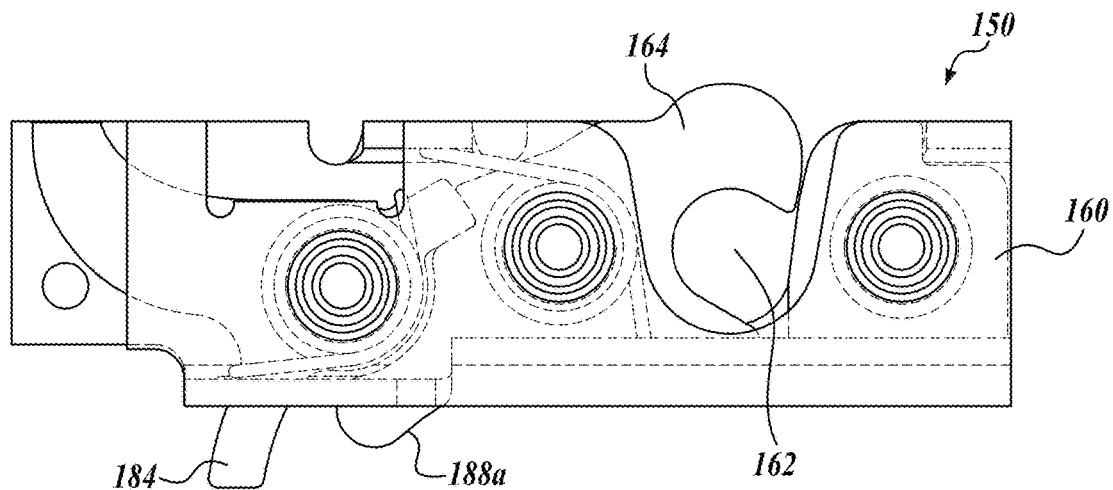
FIGS. 4A and 4B are top plan views of an example of a fairing latch and a vehicle latch, respectively.
Figure 4B:
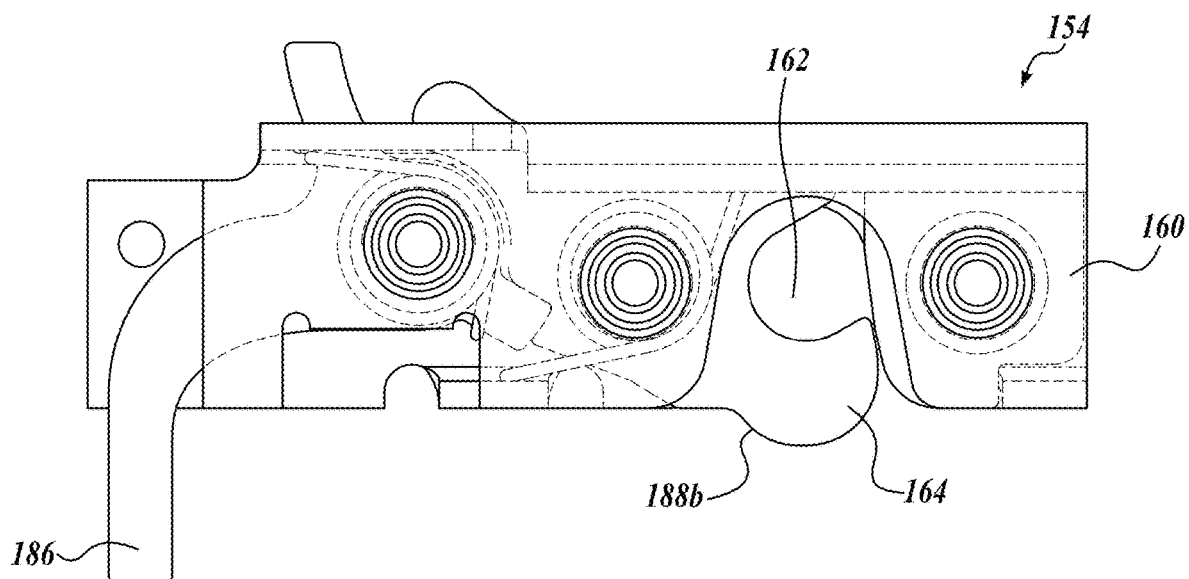

In the embodiment shown in FIGS. 2 and 3, the linkage includes a first pair of vertically oriented, round bars 136a, 136c ("vertical bars 136a, 136c"), which define the first pair of pivot axes 130a, 130c, and a second pair of vertically orientated, round bars 136b, 136d ("vertical bars 136b, 136d"), which define the second pair of pivot axes 130b, 130d The linkage 128 of the mounting system 112 further includes a plurality of support members or swing arms 140 that securely interconnect the vertical bars 136a, 136b and the vertical bars 136c, 136d. Thus, the mounting system 112 permits: (1) movement of the fairing about the first pivot axes for movement forwardly in a longitudinal direction of the vehicle and outwardly in a lateral direction of the vehicle; and/or (2) movement of the fairing about the second pivot axes for movement rearwardly in a longitudinal direction of the vehicle and outwardly in a lateral direction of the vehicle.

In the embodiment shown, the vertical bars define pivot axes that are parallel to the Z-axis of the vehicle so that the swinging or pivot motion of the fairing occurs along the X (e.g., longitudinal) and Y (e.g., lateral) axes. Of course, other orientations of the bars are contemplated in embodiments of the present disclosure. For example, the bars can be oriented to define pivot axes that are parallel to the X-axis of the vehicle so that the swinging or pivot motion of the fairing occurs along the Y (e.g., lateral) and Z (e.g., vertical) axes. In another embodiment, the bars can be oriented to define pivot axes that are parallel to the Y-axis of the vehicle so that the swinging or pivot motion of the fairing occurs along the X (e.g., longitudinal) and Z (e.g., vertical) axes. Accordingly, bars in these later two embodiments can be referred to as "horizontal" bars.

Turning now to FIGS. 2-6, the components of one representative embodiment of the mounting system 112 will be described in more detail. In that regard, the first or fairing mount includes a set of latches 150a, 150b, 150c, and 150d mounted to the fairing 104 and associated with respective vertical bars 136a, 136b, 136c, 136d. In some embodiments, the latches 150a-150d can be affixed to fairing mounting brackets, a fairing support frame, or the like. In other embodiments, the latches 150a-150d can be mounted directly to the fairing. Similarly, the second or vehicle mount includes a set of latches 154a, 154b, 154c, 154d mounted to the vehicle frame and associated with respective vertical bars 136a, 136b, 136c, 136d. In some embodiments, the latches 154a-154d can be affixed to a stationary frame, such as vehicle frame mounting brackets, vehicle frame support arms, or the like. In other embodiments, the latches 154a-154d can be mounted directly to the vehicle frame. In the embodiment shown, the latches 154a-154d are mounted to a frame 158 affixed to the frame mounted tank 116.

In some embodiments, each latch 150, 154 is configured to: (1) latch onto a respective one of the vertical bars and pivot relative to the respective one of the vertical bars; and (2) unlatch from the respective one of the vertical bars so as to be separable from the respective one of the vertical bars. In that regard, referencing FIGS. 4A and 4B, each of the latches 150, 154 includes a latch body 160 defining a bar receiving recess 162 that can be closed by a movable latching member 164. Of course, in applications where a single swinging movement is desired, non-releasable fixed pivots associated with either pair of vertical bars can be employed instead of releasable latches.

Figure 1B:
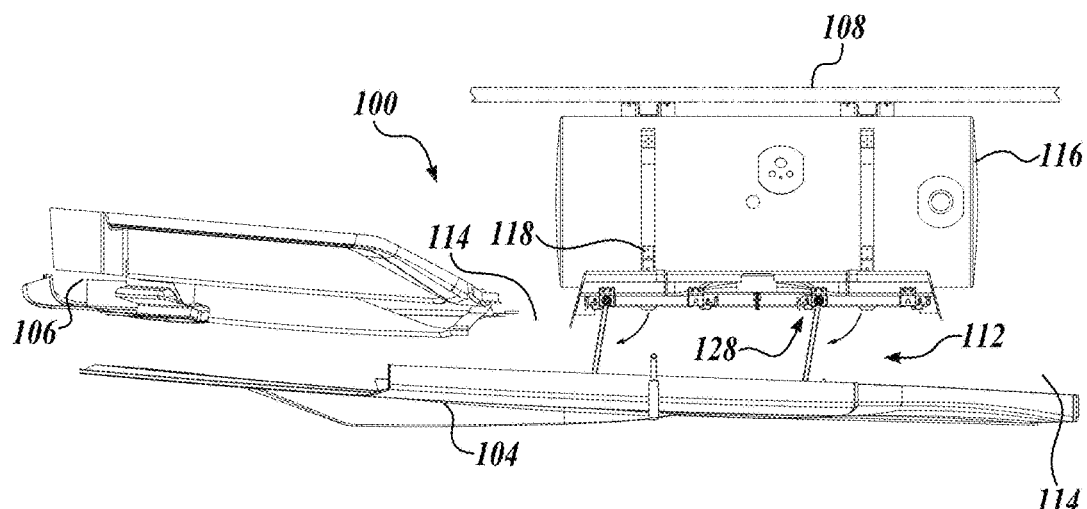
Figure 1C:
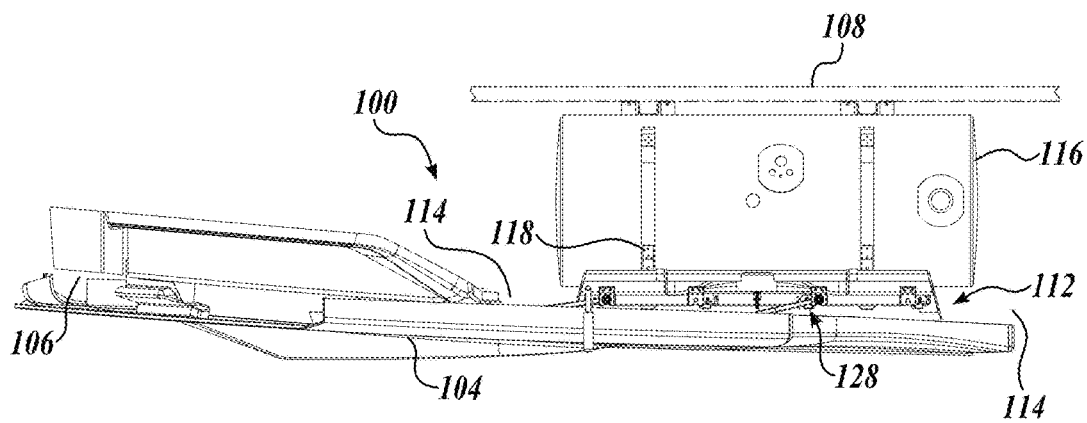
Figure 1D:
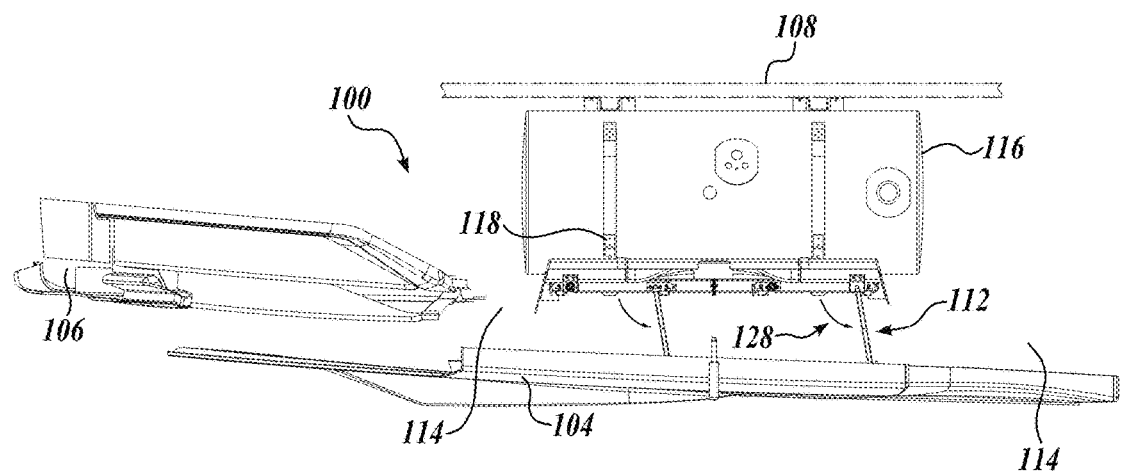
Figure 1E:
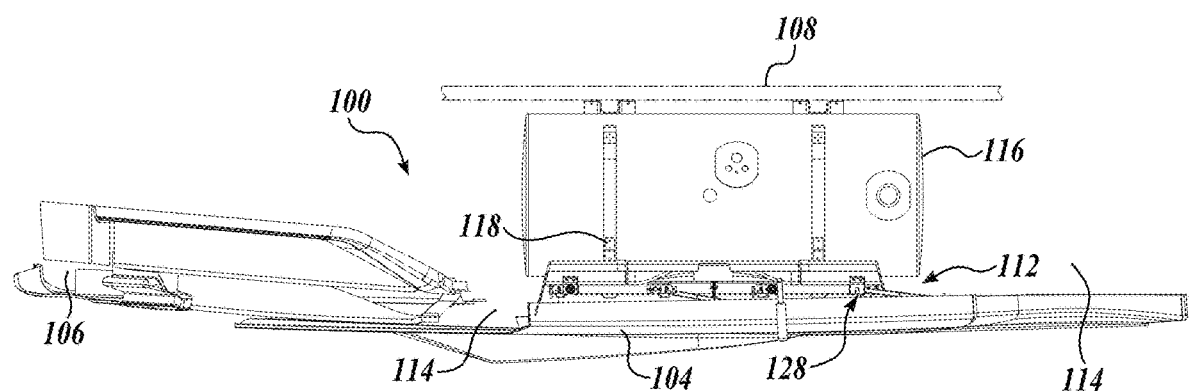

Referring again to FIGS. 2-6, the assembly 100 further comprising an actuator 170 for selectively unlatching components of the mounting system 112 to permit the fairing to swing out from the closed position of FIG. 1A to the deployed position of either FIG. 1C or 1E. For example, to permit movement of the fairing from the closed position shown in FIG. 1A to the positions shown in FIGS. 1B and 1C, the actuator 170 is configured to unlatch fairing latches 150*a*, 150*c* associated with vertical bars 136*a*, 136*c*, and vehicle latches 154*b*, 154*d* associated with vertical bars 136*b*, 136*d*. At the same time, the remaining latches, e.g., fairing latches 150*b*, 150*d* and vehicle latches 154*a*, 154*c*, remain latched onto their respective vertical bars. In this way, those latches that remain latched operate in conjunction with the vertical bars to form pivots. In the embodiment shown, the vertical bars 136*a*, 136*c* and vehicle latches 154*a*, 154*c* form the fixed pivots of a parallel motion linkage. As assembled, the vertical bars 136*a*, 136*c* can be releasably supported at their ends via support mounts 166. The vertical bars 136*b*, 136*d* and fairing latches 150*b*, 150*d* then form the movable pivots of a parallel motion linkage. As a result, the fairing 104 is permitted to pivot or swing in a first opening direction with respect to the vehicle frame about the pair of vertical bars 136*a*, 136*c* to the deployed position shown in FIG. 1C.

A second opening direction can also be achieved (shown in FIGS. 1D and 1E) by reversing the latches that were latched with the unlatched latches, and vice versa. For example, to permit movement of the fairing from the position shown in FIG. 1A to the positions shown in FIGS. 1D and 1E, the actuator 170 selectively unlatches fairing latches 150*b*, 150*d* associated with vertical bars 136*b*, 136*d*, and vehicle latches 154*a*, 154*c* associated with vertical bars 136*a*, 136*c*. At the same time, the remaining latches, e.g., fairing latches 150*a*, 150*c* and vehicle latches 154*b*, 154*d*, remain latched onto their respective vertical bars. As a result, the fairing 104 is permitted to pivot or swing in a second opening direction with respect to the vehicle frame about the pair of vertical bars 136*b*, 136*d* to the deployed position shown in FIG. 1E. In some embodiments, locks may be provided for locking each latch 150, 154, if desired.

To unlatch the latches 150, 154 in the manner described above, the actuator 170 in the embodiment shown in FIGS. 3 and 4 comprises a lever handle 174 coupled to a slide bar or plate 178. The lever handle 174 is pivotally coupled to a mount such that longitudinal movement of the lever handle 174 in either direction causes the slide bar or plate 178 to translate horizontally or parallel with respect to vehicle frame 108 (FIG. 1A). In one embodiment, a lever handle retainer 190 is provided that includes a closed track defining first and second end notches 192 and 194 and a central notch 196, as shown in FIG. 3. As the lever handle 174 pivots, the upper section of the lever handle 174 is guided by the closed track. When the lever handle 174 rests in either end notch 192 or 194, the retainer 190 retains the lever handle 174 in a fixed position thereby preventing the user from accidentally unlatching the latches in a first direction (e.g., by movement of the handle 174 to end notch 192) and then unlatching the latches in a second direction (e.g., by movement of the handle 174 to end notch 194). This prohibits inadvertent decoupling of the fairing from the vehicle.

Referencing FIGS. 2-5C, the slide bar or plate 178 includes outwardly protruding fingers 180, 182 that are suitably arranged to interface with cooperating latch fingers 184, 186 to selectively unlatch the latches 150, 154, respectively. For example, as the slide bar or plate 178 translates horizontally in a first direction as a result of an operator's movement of the lever handle 174 along the track to, for example, the first end notch 192 of retainer 190, the fingers 180, 182 protruding from the sliding bar or plate 178 engage with corresponding latch fingers 184, 186 to move the respective latching members 164 to the open position, thereby selectively opening or unlatching alternating fairing latches and vehicle latches as discussed above. This allows the fairing 104 to pivot or swing away from the vehicle frame, for example, in a forward direction, as shown in FIGS. 1B and 1C. When the sliding bar or plate 178 translates in a second direction opposite the first direction via movement of the lever handle 174 along the track to, for example, the second end notch 194, the cooperating fingers 180, 182 and 184, 186 again selectively open or unlatch the other alternating set of latches to allow the fairing to pivot or swing, for example, in a rearward direction, as shown in FIGS. 1D and 1E. In some embodiments when the fairing is in the closed position of FIG. 1A, the handle lever 174 and the slide bar or plate 178 may have a neutral position in which all of the latches 150, 154 are latched to the respective vertical bars. In one embodiment, the lever handle 174 is engaged into central notch 196 in the neutral position.

In some embodiments, the assembly also includes a failsafe mechanism or "forced latching feature" that ensures closure of any latches that may be accidentally left open (for example when not enough force is used to slam the fairing shut) prior to fairing movement. In other words, the forced latching feature ensures that a latch that is intended to be latched is in fact latched before any other latches are unlatched. As will be described below, this can be accomplished in some embodiments by having two control interfaces per latch 150, 154. The first interface is a forced latching interface and the second interface is a latch release, such as latch fingers 184, 186.

Figure 5A:
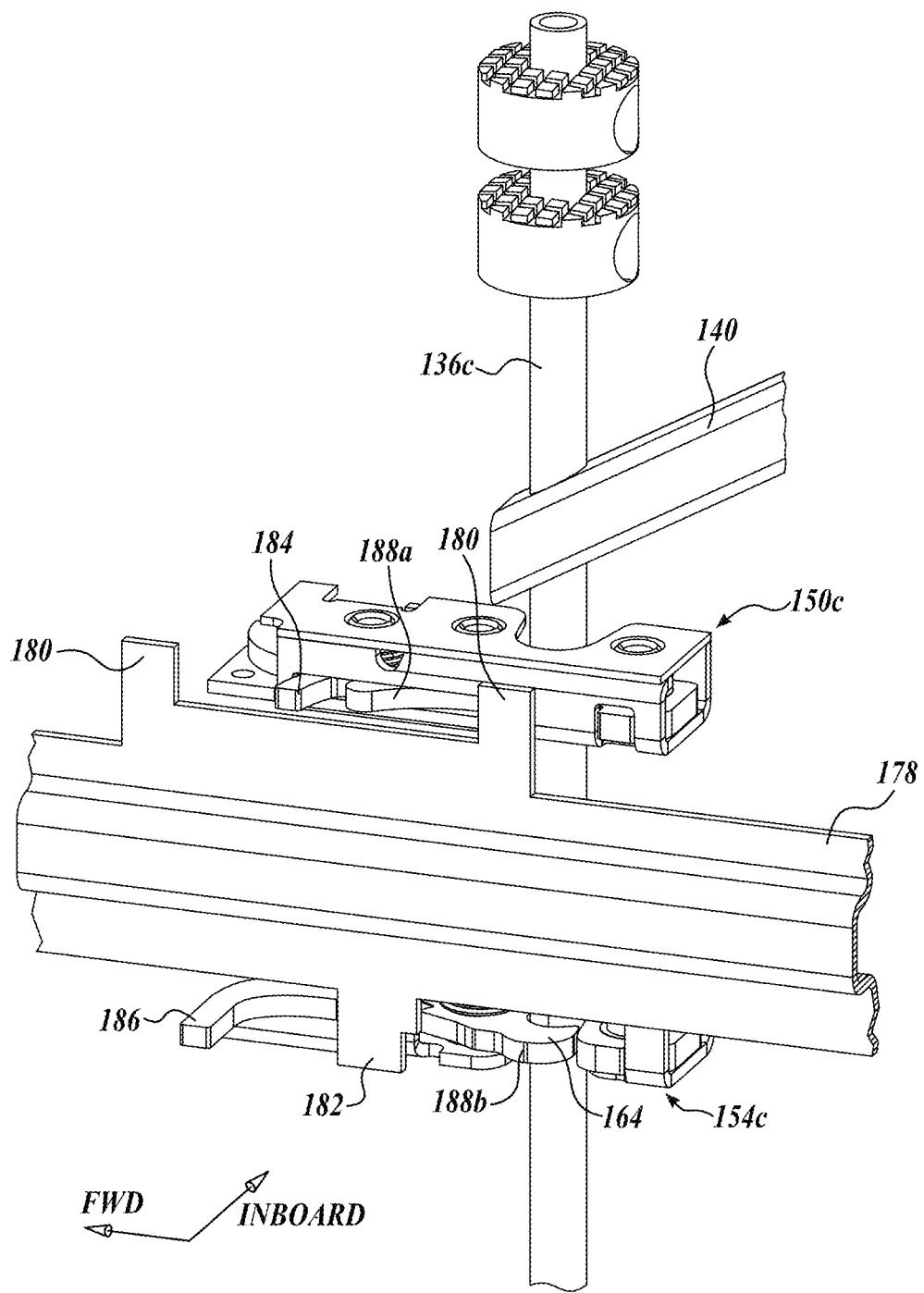
FIGS. 5A-5C depict an example of a forced latching aspect of the present disclosure.
Figure 5B:
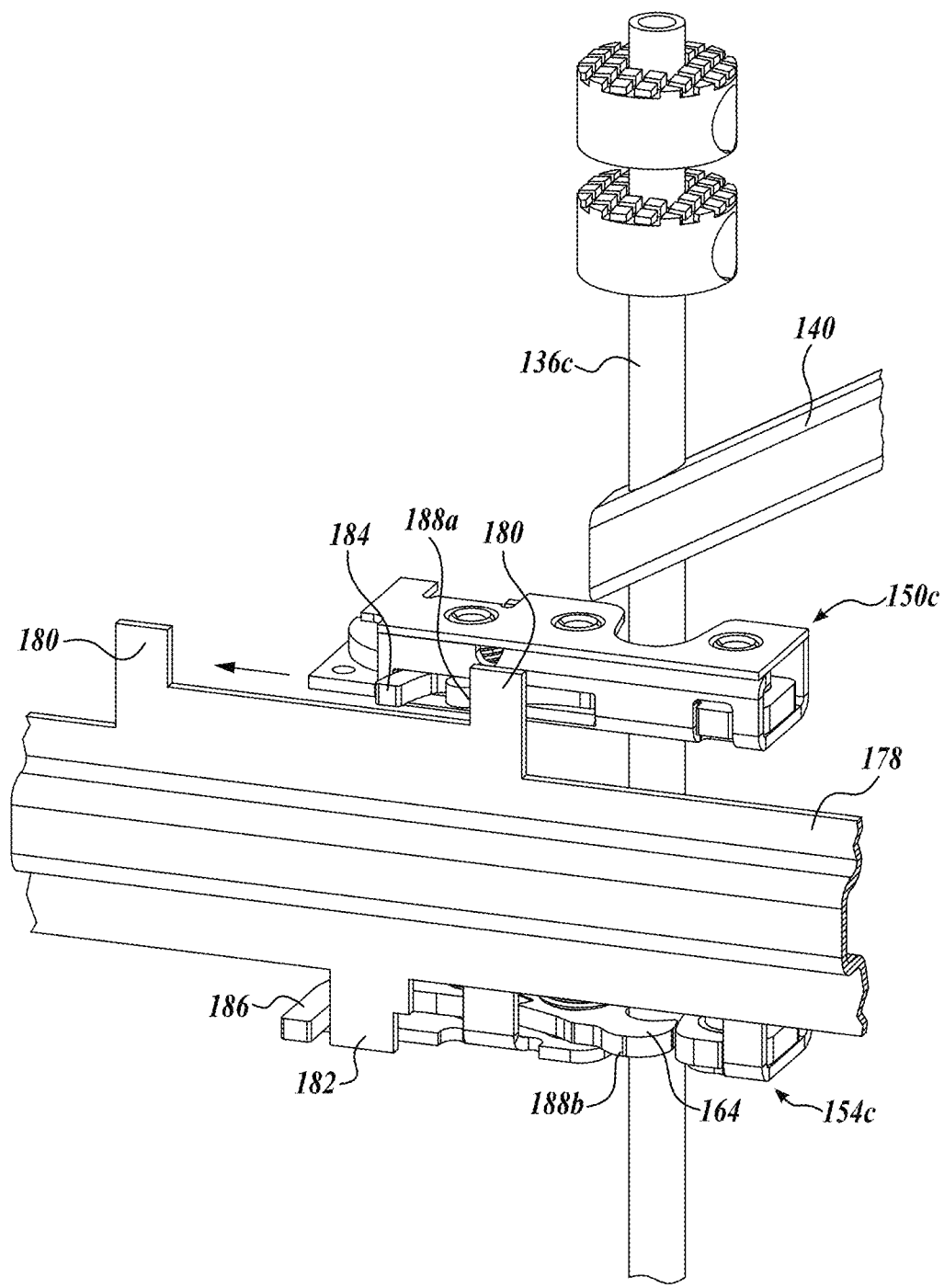
Figure 5C:
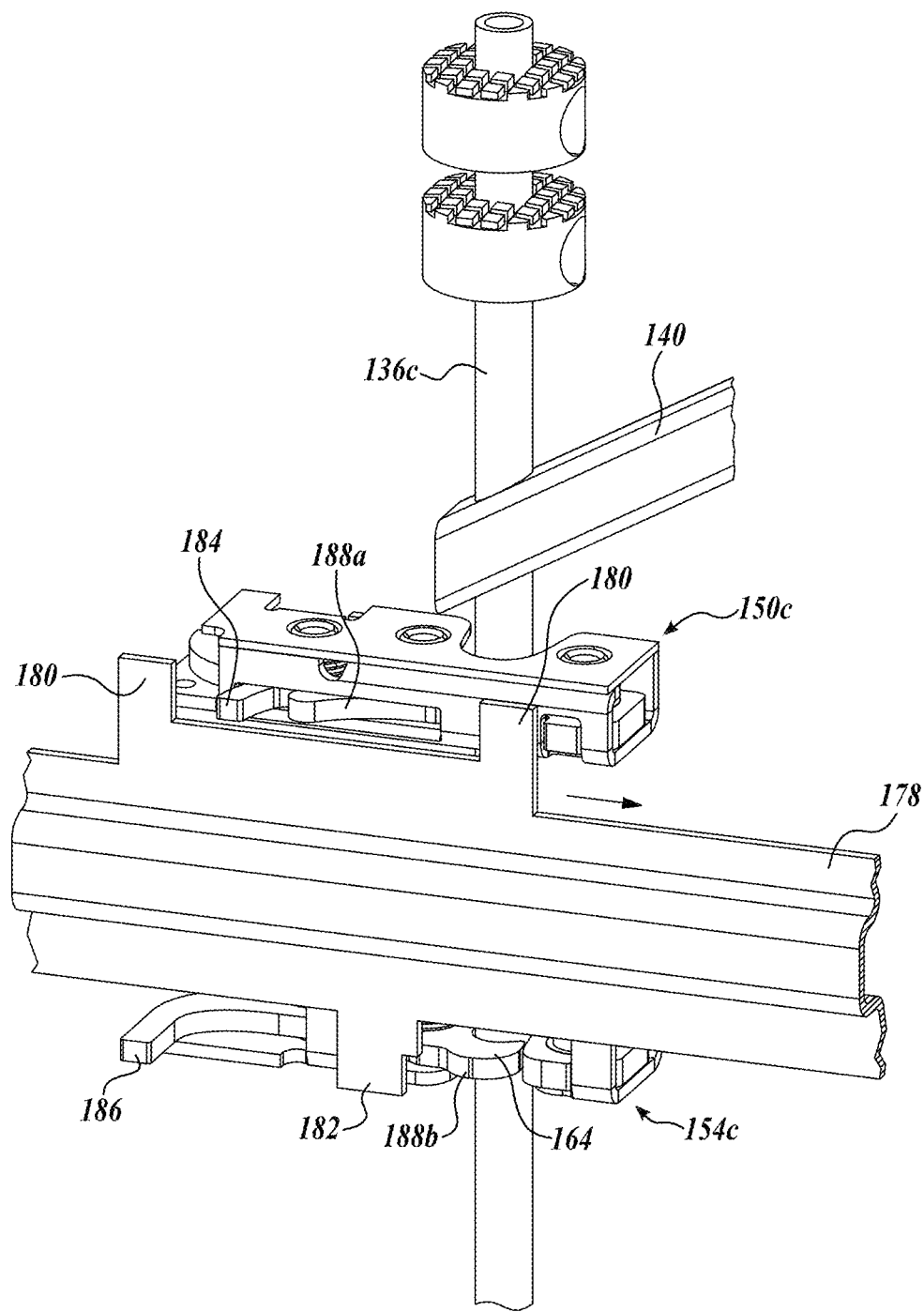

In that regard, attention is directed to FIGS. 5A-5C, which depict a partial perspective view of the components associated with vertical bar 136*c*. Operator movement of the lever handle 174 within retainer 190 causes movement of the slide bar or plate 178 in, for example, a forward direction from its position shown in FIG. 5A to a position shown in FIG. 5B. As shown in FIG. 5B, the finger 180 is capable of engaging forced latching interface 188*a* prior to finger 182 engaging latch finger 186 (e.g., the latch release or second interface). For example, if the latch member 164 of latch 150*c* is fully latched, the finger 180 slides past the forced latching interface 188*a* without contact. On the other hand, if the latch member 164 of latch 150*c* is not fully latched about vertical bar 136*c*, the forced latching interface 188*a* protrudes outwardly into the path of the finger 180. As a result, the finger 180 imparts a force against the forced latching interface 188*a*, which causes the latching member (hidden in FIG. 5A) to be rotated into its latched position. This ensures that latch 150*c* is in fact latched prior to unlatching the latch 154*c*.

Similarly, operator movement of the lever handle 174 in the opposite direction causes movement of the slide bar or plate 178 in, for example, a rearward direction from its position shown in FIG. 5A to a position shown in FIG. 5C. As shown in FIG. 5C, the finger 182 is capable of engaging forced latching interface 188*b* prior to finger 180 engaging latch finger 184 (e.g., the latch release or second interface). For example, if the latch member 164 of latch 154*c* is fully latched, the finger 180 slides past the forced latching interface 188*b* without contact. On the other hand, if the latch member 164 of latch 154c is not fully latched about vertical bar 136c, the forced latching interface 188b protrudes outwardly into the path of the finger 182. As a result, the finger 182 imparts a force against the forced latching interface 188b, which causes the latching member 164 to be rotated into its latched position.

FIGS. 7A-7G illustrate another representative embodiment of a mounting system, generally designated 212, suitable for coupling the fairing to a stationary part, such as the frame, of the vehicle, and permitting the fairing to swing out in either one of two, opposite directions. The mounting system 212 is substantially similar in construction and operation to the mounting system 112 described above except for the differences that will be described in detail below. In that regard, the mounting system 212 includes a first or fairing mount for coupling to the fairing, a second or vehicle mount for coupling to a stationary frame, such as vehicle, and linkage 228 interconnecting the first and second mounts. The linkage 228 comprises support members or swing arms 240 that interconnect vertical bars 236a, 236b and vertical bars 236c, 236d. In the embodiment shown, the ends of swing arms 240 include bosses 242 that define interior bearing surfaces against which the vertical bars 236 can both rotate and translate. As such, the vertical bars 236 are movably restrained by the swing arms 240.

Figure 7A:
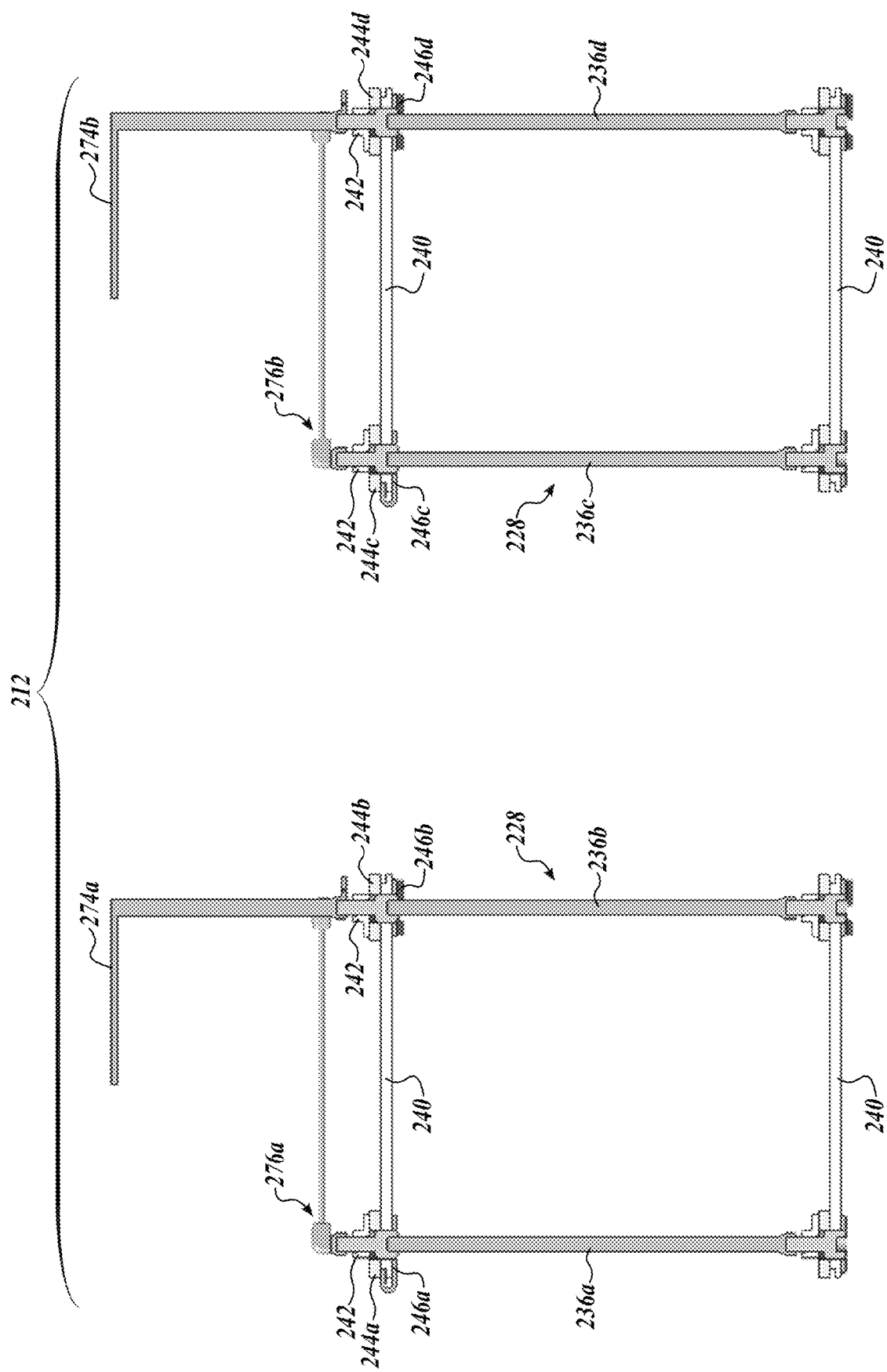
Figure 7B:
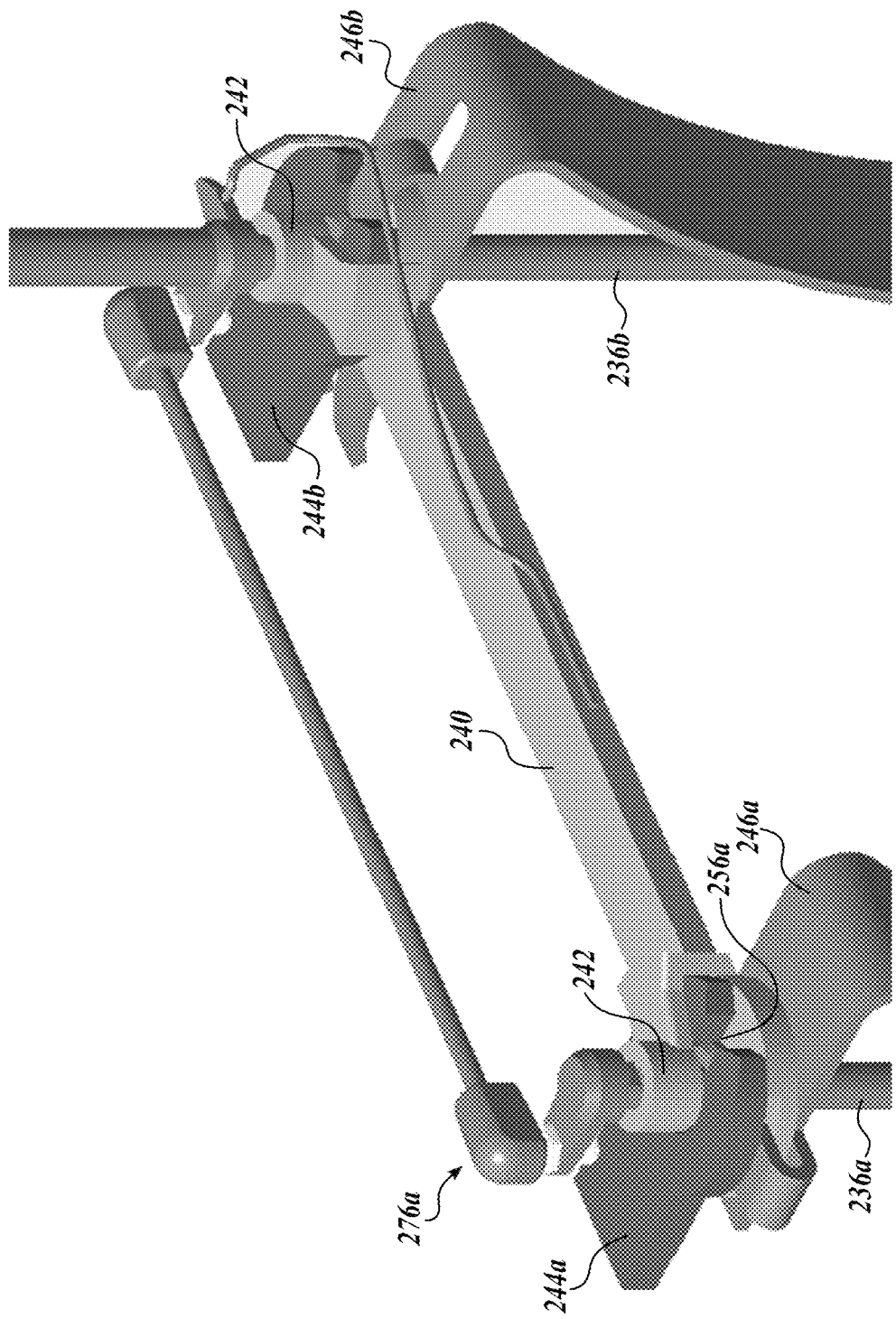
Figure 7F:
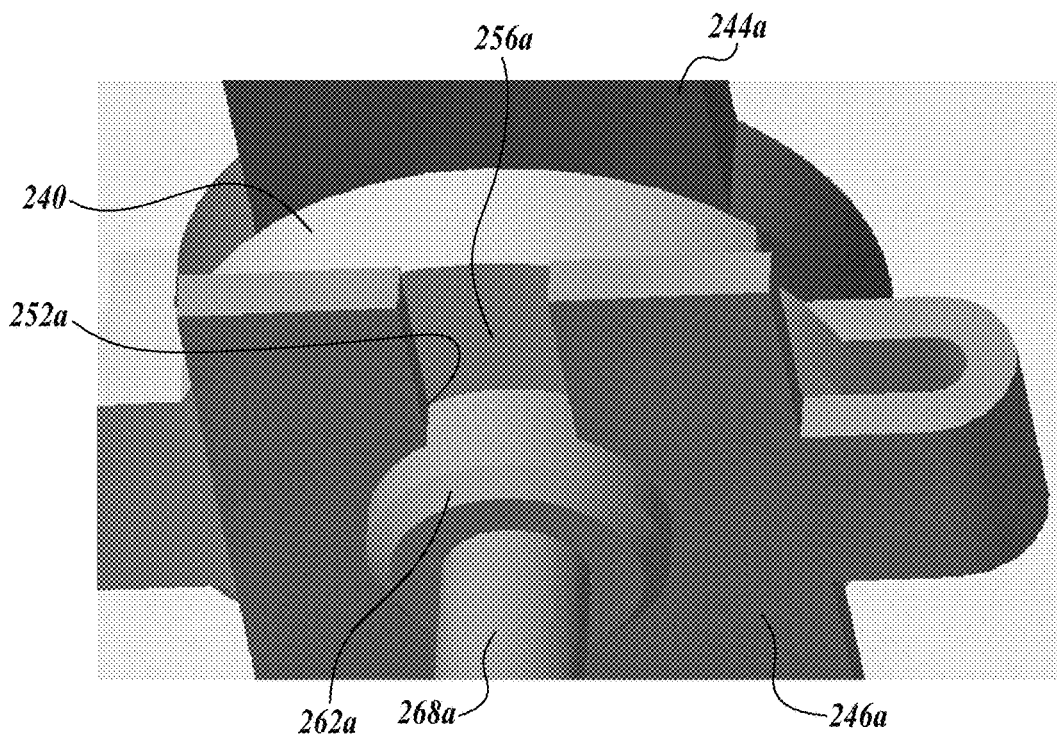
Figure 7G:
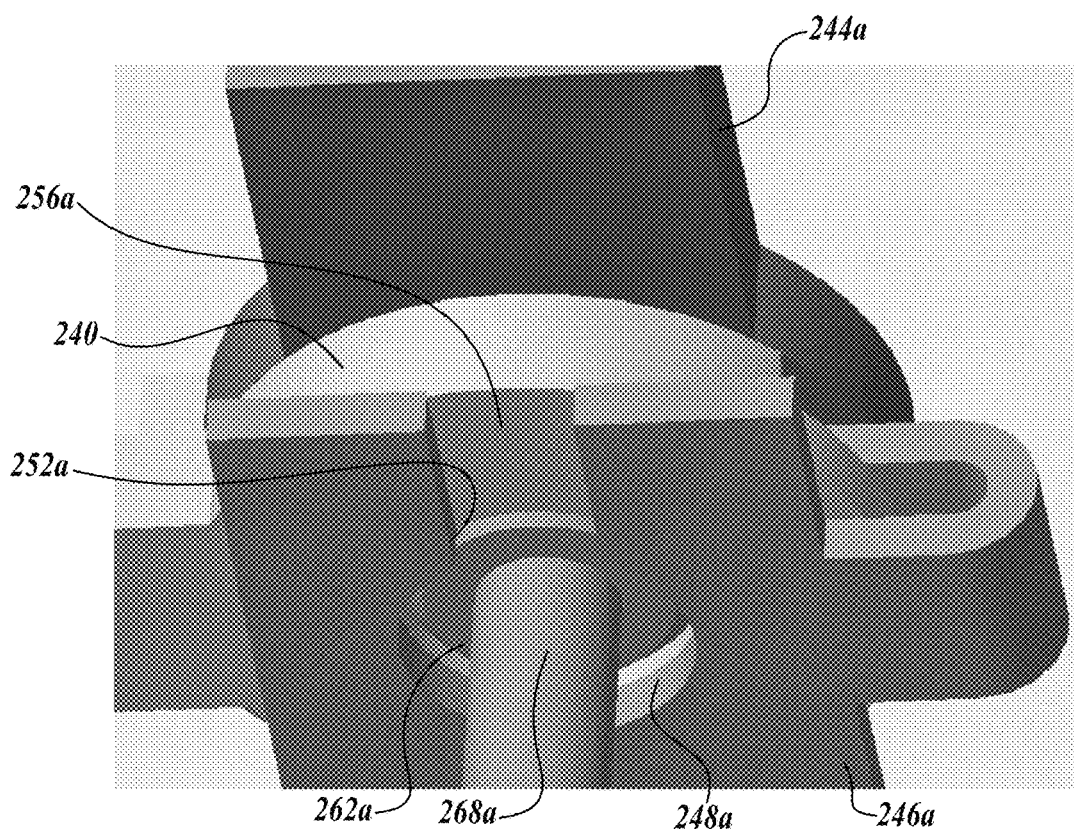

As shown in FIG. 7A, the fairing mount and the vehicle mount each include respective mounting members 244a-244d and 246a-246d, which are associated with respective vertical bars 236a-236d. Instead of employing latches with movable latching members, each mounting member 244a-244d, 246a-246d of the first and second mounts includes a key hole or similar structure for interfacing with the respective vertical bar. For example, as shown in the embodiment of FIGS. 7F and 7G showing mounting members 244a, 246a, each key hole includes a circular recess 248 and spaced apart retainer surfaces or shoulders 252 that defines a slot opening 256 having a width smaller than the circular recess 248.

When assembled, the ends of each swing arm 240 is stacked between fairing mounting member 244 and the vehicle mounting member 246 such that their circular recesses 248 are aligned, as shown in the cross-sectional view of FIG. 7C. In use, the key holes of the mounting members 244, 246 selectively interface with bar sections 258 of the vertical bars 236 to form latches or latching mechanisms that selectively latch the mounting members 244, 246 to the vertical bars 236.

As shown in FIGS. 7A and 7C, the bar section 258 of each vertical bar 236 includes a cylindrical piston portion 262 of increased diameter positioned below a second portion having a helical groove 264 formed in the surface of the vertical bar 236. When assembled, the helical groove 264 cooperates with a stud follower 266 positioned on an interior surface of the boss 242. Accordingly, rotational movement of the vertical bar 236 is translated into linear motion of the vertical bar 236. As will be described in more detail below, the bar sections 258 of each pair of vertical bar pairs 236a, 236b and 236c, 236d include both left hand and right hand helical grooves 264 such that rotation of the vertical bars pairs 236a, 236b and 236c, 236d cause the respective bars of the vertical bar pairs to translate in opposite directions. Of course, other structure that transmits rotary movement into linear translation can also be employed. For example, the vertical bar and the boss can include cooperating threads to form a lead screw mechanism.

As mentioned above, the key holes of both the fairing and vehicle mounting members are configured for selectively interfacing with sections 258 of the vertical bars 236. In that regard, the diameters of the piston portion 262 and the vertical bar portions 268 at adjacent ends of the piston portion 262 are chosen such that: (1) when a vertical bar portion 268 is aligned with the slot opening 256 of a mounting member 244 or 246, the mounting member 244 or 246 is unlatched from the bar 236 as the bar is permitted to pass from the circular recess 248 outwardly through the slot opening 256; and (2) when the piston portion 262 is aligned with the slot opening 256 of a mounting member 244 or 246, the mounting member 244 or 246 remains latched to the bar 236 as the bar is prohibited from passing through the slot opening 256 via engagement against shoulders 252. As such, the interface between the key holes of the mounting members 244, 266 and the profile of the bar sections 258 acts as a latch or unlatch mechanism for selectively latching/unlatching the mounting members 244, 246 to the vertical bars 236.

Referring now to FIGS. 6A and 6B, the actuator 270 in this embodiment includes two separate handle levers 274a, 274b. Each handle lever 274a, 274b is coupled for rotation with one bar 236b, 236d of the vertical bar pairs 236a, 236b and 236c, 236d. The actuator 270 also includes link and lever arrangements 276a, 276b that transmit the rotational motion of the lever handles 274a, 274b and vertical bars 236b, 236d, respectively, to the other vertical bars 236a, 236c of the vertical bar pairs.

The operation of the mounting system 212 will now be described in detail with regard to FIGS. 7A-7G. To permit the fairing to swing away from the vehicle in a first direction, the operator rotates each handle lever 274a, 274b in the same direction (e.g., clockwise). Rotation of the hand levers 274a, 274b is transmitted to each vertical bar of the bar pairs 236a, 236b and 236c, 236d via the link and lever arrangements 276a, 276b. Due to the left hand and right hand configuration of the helical grooves 264 associated with each vertical bar pair, rotation of the vertical bars causes the followers 266a-266d to move within its respective grooves 264a-264d, thereby forcing the respective vertical bars of each vertical bar pair in opposite directions.

As the vertical bars of the vertical bar pars 236a, 236b and 236c, 236d move in opposite directions, the piston portions 262a, 262c of vertical bars 236a, 236c aligns, for example, with the swing arms 240 and the vehicle mounting members 246a, 246c, and the piston portions 262b, 262d of vertical bars 236b, 236d aligns, for example, with the swing arms 240 and the fairing mounting members 244b, 244d. At the same, the vertical bar portions 268a, 268c of vertical bars 236a, 236c align with the slot openings 256a, 256c of fairing mounting members 244a, 244c, and the vertical bar portions 262b, 262d of vertical bars 236b, 236d aligns, for example, with the vehicle mounting members 246b, 246d. As such, the piston portions "lock" the swing arms 240 to respective vehicle mounting members 246a, 246c and to the fairing mounting members 244b, 244d, while the fairing mounting members 244a, 244c are permitted to unlatch from the vertical bars 236a, 236c and vehicle mounting members 246b, 246d are permitted to unlatch from the vertical bars 236b, 236d. As a result, the fairing is permitted to pivot or swing away in a first opening direction about the pair of vertical bars 236a, 236c.

To permit the fairing to swing away from the vehicle in a second direction opposite the first, the operator rotates each handle lever 274a, 274b in a counter-clockwise direction. Due to the left hand and right hand configuration of the helical grooves 264 for each vertical bar pair, rotation of the vertical bars causes the vertical bars move in opposite directions as described above (e.g., when the handle levers are rotated clockwise). In this embodiment, the piston portions 262b, 262d of vertical bars 236b, 236d aligns, for example, with the swing arms 240 and the vehicle mounting members 246b, 246d, and the piston portions 262a, 262c of vertical bars 236a, 236c aligns, for example, with the swing arms 240 and the fairing mounting members 244a, 244c. At the same, the vertical bar portions 268b, 268d of vertical bars 236b, 236d align with the slot openings 256b, 256d of fairing mounting members 244b, 244d, and the vertical bar portions 262a, 262c of vertical bars 236a, 236c aligns, for example, with the vehicle mounting members 246a, 246c. As such, the piston portions "lock" the swing arms 240 to respective vehicle mounting members 246b, 246d and to the fairing mounting members 244a, 244c, while the fairing mounting members 244b, 244d are permitted to unlatch from the vertical bars 236b, 236d and vehicle mounting members 246a, 246c are permitted to unlatch from the vertical bars 236a, 236c. As a result, the fairing is permitted to pivot or swing in a second opening direction about the pair of vertical bars 236b, 236d.

Figure 8A:
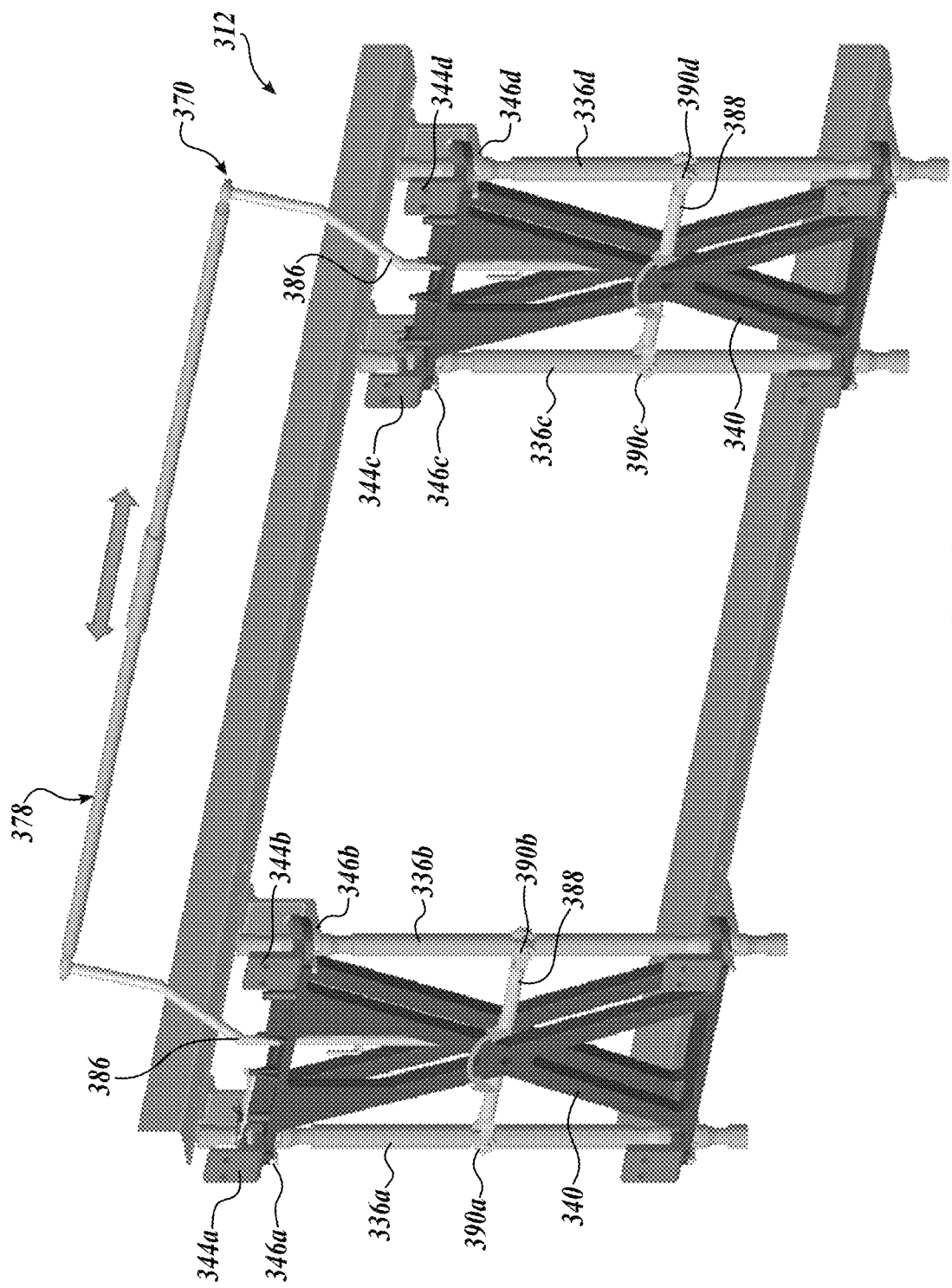
FIG. 8A is a perspective view of still another representative embodiment of a mounting system in accordance with the present disclosure.
Figure 8B:
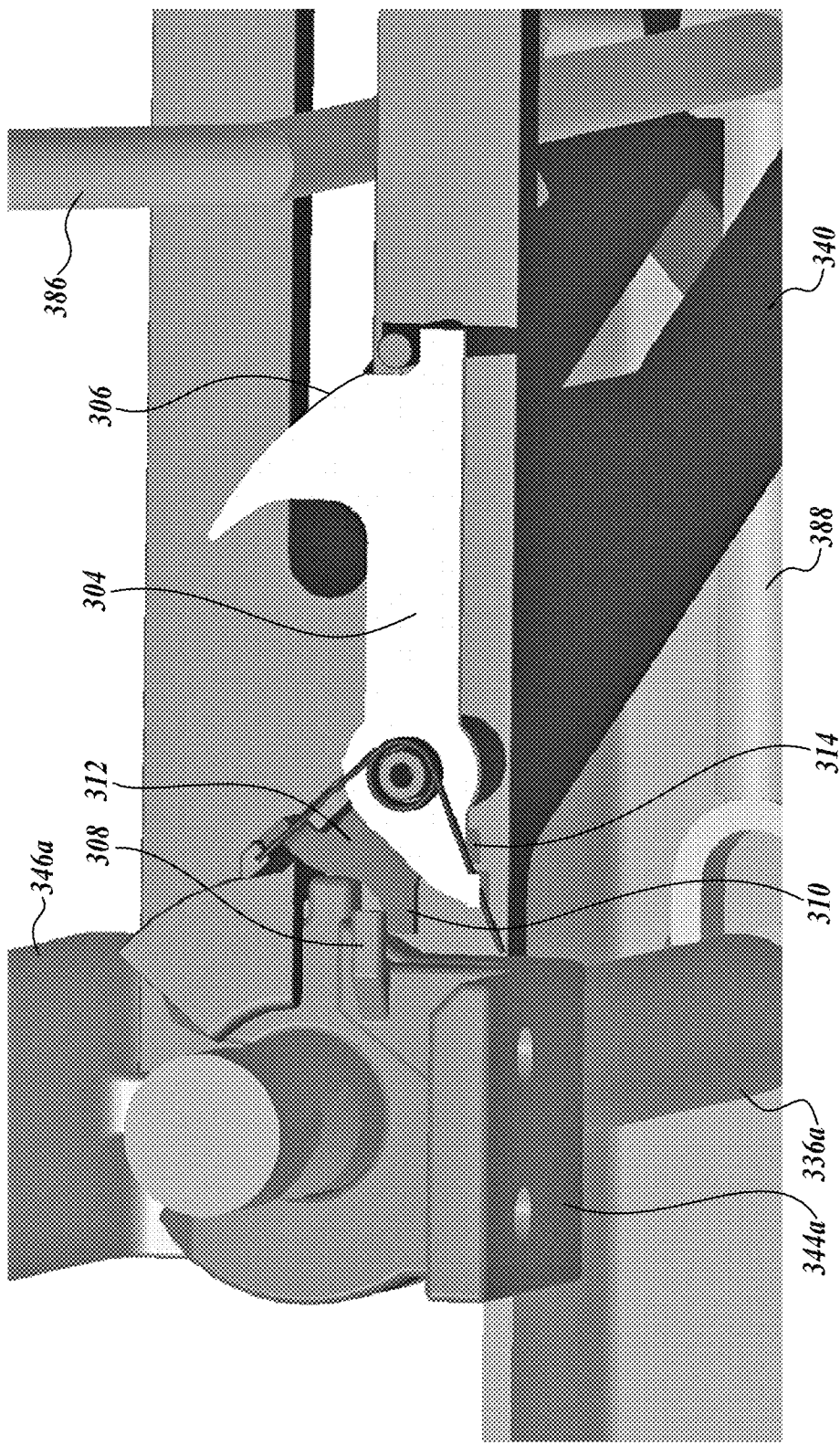
FIG. 8B is a partial top perspective view of one representative embodiment of a lock mechanism for use with the mounting system of FIG. 8A.

FIGS. 8A and 8B illustrate another representative embodiment of a mounting system, generally designated 312, suitable for coupling the fairing to a stationary part, such as the frame, of the vehicle, and permitting the fairing to swing out in either one of two, opposite directions. The mounting system 312 is substantially similar in construction and operation to the mounting system 212 described above except for the differences that will be described in detail below.

For example, instead of the helical groove/follower arrangement for providing vertical motion of the bar pairs, the actuator 370 may include another embodiment of an actuator that provides vertical motion of the bars. In that regard, the actuator 370 includes a horizontally oriented slide handle 378 connected at its ends to first and second vertical links 386. The lower ends of each vertical link 386 are secured to respective horizontal links 388, which are pivotally connected at their mid-span to respective swing arms 340. The ends of each horizontal link 388 are connected via clevis joints 390a-390d to the vertical members 336a-336d, respectively. In use, when an operator moves the slide handle 378 in either direction (shown by the arrow in FIG. 8A), the vertical links 388 cause the horizontal links 388 to pivot, thereby affecting vertical motion of the vertical bars of the vertical bar pairs 336a, 336b and 336c, 336d in opposite directions.

FIG. 8B illustrates one representative embodiment of a locking mechanism, designed 302, that can be employed by the mounting system 312 for preventing vertical link movement when the fairing is in one of the two open positions. As shown in FIG. 7B, the locking mechanism 302 includes a lock member 304 that is biased to a closed position.

When the vertical link 386 is moved in a first direction toward the lock member 304, the contact surface profile 306 of lock member 304 causes the lock member to pivot in a clockwise direction against a biasing force of the spring. Once the vertical link is past the contact surface, the biasing force returns to the lock member to the position shown in FIG. 8B. The fairing can now be moved to the open position. As the fairing is moved to an open position, a tab 308 positioned on fairing mounting member 344a causes rotation of a tab 310 of a striker 312 to a position that does not actuate the lock member 304. Thus, when the fairing is in an opening position, the vertical link, and thus its associated slide handle, is locked for movement by the lock member 304. Only when the fairing is returned to the close position, the tab 308 forces the tab 310 clockwise, rotating striker 312. Via tab 314 on striker 312, clockwise rotation of the striker 312 causes the lock member 304 to pivot again in a clockwise direction a biasing force of the spring, thereby releasing the vertical link 386.

Figure 9A:
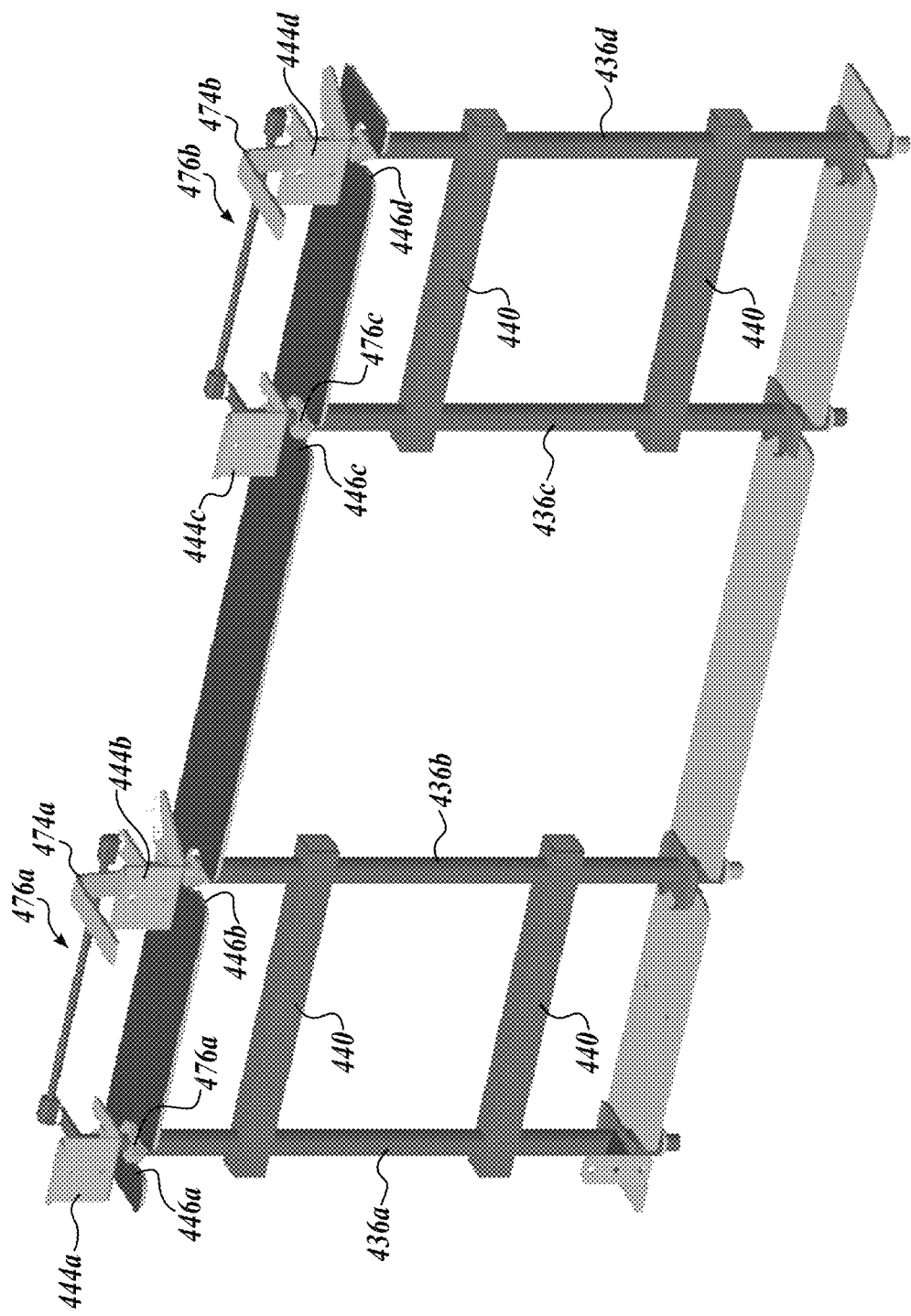
FIGS. 9A-9B illustrate yet another representative embodiment of a mounting system in accordance with the present disclosure.
Figure 9B:
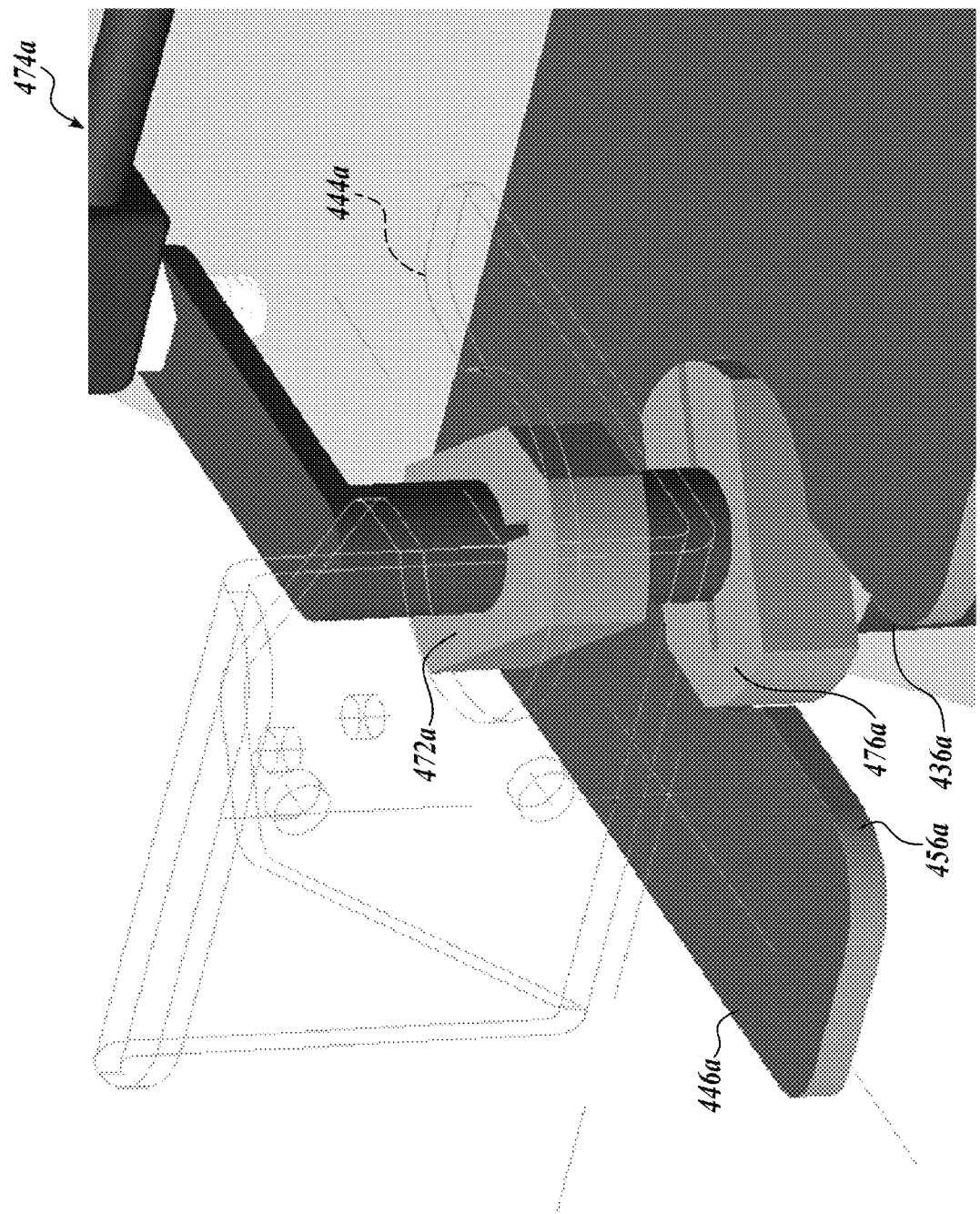

FIGS. 9A-9C is another representative embodiment of a mounting system, generally designated 412, suitable for coupling the fairing to a stationary part, such as the frame, of the vehicle, and permitting the fairing to swing out in either one of two, opposite directions. The mounting system 412 is substantially similar in construction and operation to the mounting system 212 described above except for the differences that will be described in detail below. In that regard, the mounting system 412 is configured so that vertical translation of the vertical bars is not required to unlatch the mounting members 444 and 446. For example, instead of a piston/helical groove section, each vertical bar 436 includes spaced apart first and second cam pairs 472, 476 oriented at right angles to one another. The first cams 472 interface with the key holes of the fairing mounting members 444 and the second cams 476 interface with the keyholes of the vehicle mounting members 446. In order to alternatingly latch and unlatch the mounting members 444 the orientation of the first cams 472 alternate 90 degrees between bars 436a-436d. Similarly, in order to alternatingly latch and unlatch the mounting members 446, the orientation of the second cams 476 alternate 90 degrees between bars 436a-436d.

As a result of rotation of the actuator in a clockwise direction, the fairing is permitted to pivot or swing away in a first opening direction about the pair of vertical bars 436a, 436c. Similarly, as a result of rotation of the actuator in a counter-clockwise direction, the fairing is permitted to pivot or swing in a second opening direction about the pair of vertical bars 436b, 436d.

Figure 10A:
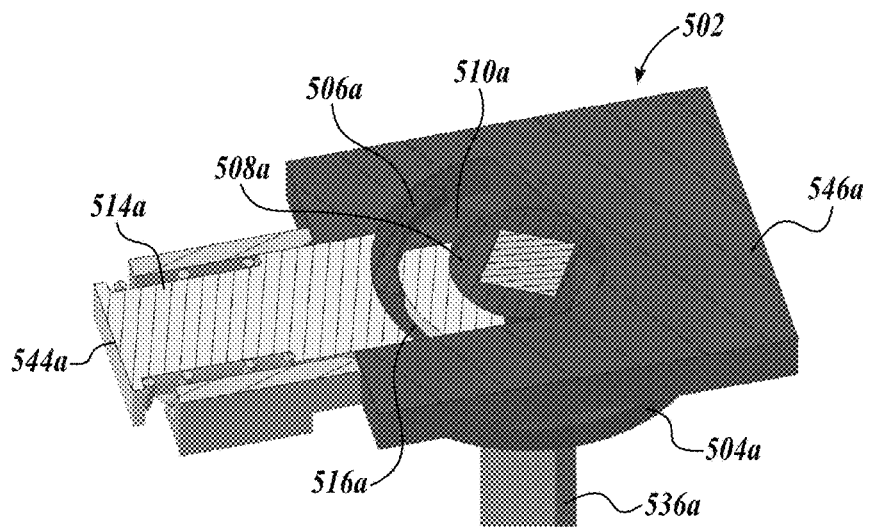
FIGS. 10A-10C illustrate a representative embodiment of a latch mechanism that can be employed in a mounting system in accordance with the present disclosure.
Figure 10B:
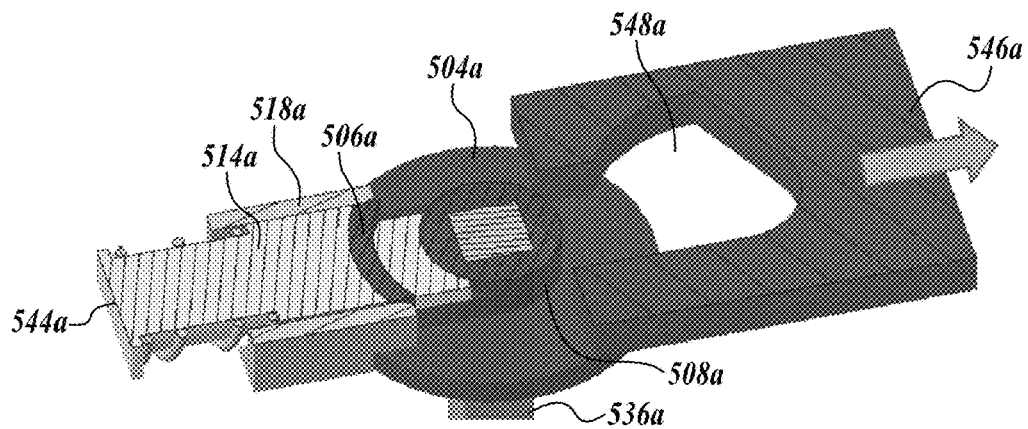
Figure 10C:
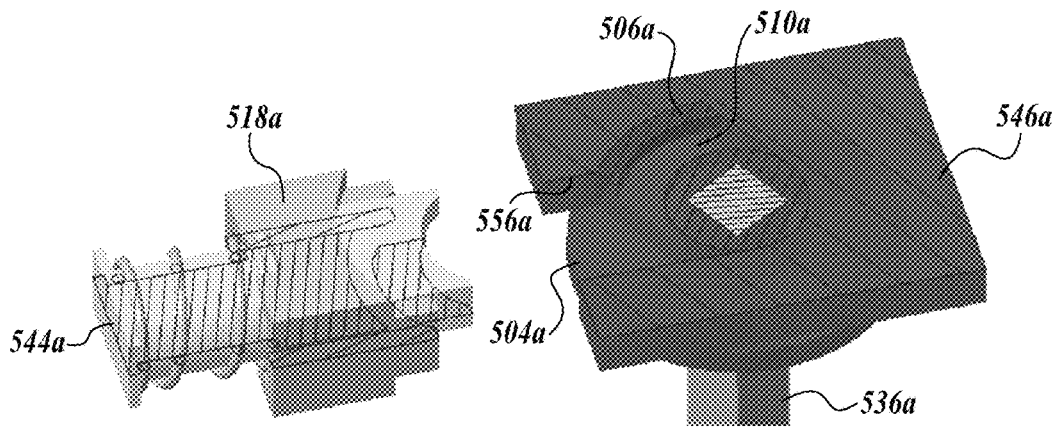

FIGS. 10A-10C illustrate a representative embodiment of a latch mechanism 502 that can be employed in a mounting system in accordance with the present disclosure. As shown in FIGS. 10A-10A, the latch mechanism 502 includes a disc member 504 fixed for rotation with a vertical bar 536. The disc member 504 includes an arcuate latching member 506 spaced radially outwardly of a center, cylindrical boss section 508. Between the arcuate latching member 506 and the center, cylindrical boss section 508 there is formed an arcuate slot 510.

In the embodiment shown in FIG. 10A, the vehicle mounting member 546 includes a key hole configured to receive the arcuate latching member 506 and boss section 508 of the disc member 504 therein. On the other hand, the fairing mounting member 544 includes an elongate body 514 dimensioned to be received by the slot opening 556a of the key hole, and defining an accurate slot 516 for receiving the latching member 506 in a rotatable manner, as shown in FIGS. 10A and 10C.

FIG. 10A illustrates both the fairing mounting member 544a and the vehicle mounting member 546a latched to the vertical bar 536a. From the position of FIG. 10A, the vertical bar 536a can be rotated in a first direction (counter-clockwise in FIGS. 10A and 10B) via an actuator (not shown) such that the latching member 506a is completely received by the accurate slot 516a of the fairing mounting member 544a. Once completely received by the accurate slot 516a, the vehicle mounting member 546a becomes unlatched, and can be separated from the fairing mounting member 544a and the vertical bar 536a as shown in FIG. 10B, which remain latched together.

On the other hand, from the position of FIG. 10A, the vertical bar 536a can be rotated in a second direction (clockwise in FIGS. 10A and 10B) via an actuator (not shown) such that the latching member 506a is completely removed from the accurate slot 516a of the fairing mounting member 544a and positioned away from the slotted opening 556a. Once completely removed from the accurate slot 516a, the fairing mounting member 544a becomes unlatched, and can be separated from the vehicle mounting member 546a and the vertical bar 536a as shown in FIG. 10C, which remain latched together. A biased locking collar 518a can be provided that locks the orientation of the vertical bar 536a as shown in FIG. 10B.

In the description above, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A vehicle panel mounting assembly, comprising:
   a panel;
   a mounting system configured to mount the panel on a stationary part of a vehicle, the mounting system including a first mount mounted on the panel, a second mount configured to be mounted on the stationary part, and at least one support member interconnecting the first mount and the second mount;
   wherein the mounting system configured to support the panel in a stationary manner and to permit movement of the panel simultaneously in two perpendicular directions with respect to the stationary part.

2. The vehicle panel mounting assembly of claim 1, wherein movement of the panel simultaneously in two perpendicular directions with respect to the stationary part is selected from a group of movements consisting of:
   forwardly in a longitudinal direction of the vehicle and outwardly in a lateral direction of the vehicle;
   rearwardly in a longitudinal direction of the vehicle and outwardly in a lateral direction of the vehicle; and
   forwardly in a longitudinal direction of the vehicle and outwardly in a lateral direction of the vehicle and rearwardly in a longitudinal direction of the vehicle and outwardly in a lateral direction of the vehicle.

3. The vehicle panel mounting assembly of claim 1, further comprising an actuator movable between a first actuator position, in which the panel is unlatched and is permitted to swing away from the stationary part in a clockwise motion, and a second actuator position, in which the panel is unlatched and is permitted to swing away from the stationary part in a counter-clockwise motion, the actuator having a neutral position inbetween the first and section actuator positions, in which the panel is latched so as to not be permitted to swing away from the stationary part.

4. The vehicle panel mounting assembly of claim 3, wherein the actuator includes a handle lever that moves within a track formed in a mounted retainer, the track defining first and second end notches and a central notch disposed in-between the first and second notches, wherein the handle lever is: (1) contained by the first notch in the first actuator position; (2) contained by the second notch in the second actuator position; and (3) contained by the central notch in the neutral position.

5. The vehicle panel mounting assembly of claim 1, wherein the mounting system includes a set of latches, each latch having a latched state and an unlatched state, the mounting assembly further comprising an actuator configured to actuate a subset of the latches from the latched state of the subset of latches to the unlatched state of the subset of latches, the remaining latches of the set of latches maintained in the latched state so as to permit the panel to swing away from the stationary part.

6. The vehicle panel mounting assembly of claim 1, wherein the mounting system includes first and second pairs of vertical bars that define first and second pairs of pivot axes, respectively, the mounting system configured to: (1) permit movement of the panel with respect the stationary part about the first pivot axes for movement forwardly in a longitudinal direction of the vehicle and outwardly in a lateral direction of the vehicle; or (2) permit movement of the panel with respect the stationary part about the second pivot axes for movement rearwardly in a longitudinal direction of the vehicle and outwardly in a lateral direction of the vehicle.

7. The vehicle panel mounting assembly of claim 6, wherein:
   the first mount includes a set of four panel mount latches, each configured to: (1) latch onto a respective one of the vertical bars and pivot relative to the respective one of the vertical bars; and (2) unlatch from the respective one of the vertical bars so as to be separable from the respective one of the vertical bars; and the second mount includes a set of four stationary part mount latches, each configured to: (1) latch onto a respective one of the vertical bars and pivot relative to the respective one of the vertical bars; and (2) unlatch from the respective one of the vertical bars so as to be separable from the respective one of the second bars, wherein the mounting assembly further comprises an actuator configured to selectively latch two of the panel mount latches about the first or second pair of vertical bars to form a pair of fixed pivots, to selectively latch two of the second part mount latches about the other of the first or second pair of vertical bars to form a second pair of movable pivots, and configured to selectively unlatch the remaining two panel mount latches and the remaining two stationary part mount latches.

8. The vehicle panel mounting assembly of claim 1, wherein the mounting system includes means for permitting movement of the panel about a first pair of fixed pivots associated with the stationary part in a first operational state and for permitting movement of the panel about a second pair of fixed pivots associated with the stationary part in a second operational state.

9. The vehicle panel mounting assembly of claim 8, further comprising means for selecting the first operational state or the second operational state such that the panel is able to swing away from the stationary part about the first pair of fixed pivots or able to swing away from the stationary part about the second pair of fixed pivots dependent on the selected operational state.

10. The vehicle panel mounting assembly of claim 1, wherein
the first mount includes a plurality of spaced apart mounting members each configured to be mounted on the panel and including a circular recess connected to a slotted opening;
the second mount including a plurality of spaced apart mounting members each configured to be mounted on the stationary part and including a circular recess connected to a slotted opening; and
wherein the mounting assembly further comprises linkage interconnecting the first mount and the second mount, the linkage including first and second pairs of bars and at least one support arm interconnecting the bars of the first and second pairs of bars, the first and second pairs of bars having first portions thereof that are dimensioned to be received into the circular recess through the slotted openings of the mounting members of the first and second mounts and second portions that are prohibited from movement through the slotted openings of the mounting members.

11. The vehicle panel mounting assembly of claim 10, further comprising
an actuator configured to selectively unlatch the mounting members of the first and second mounts that are associated with first bars of the first and second pairs of bars by alignment of the first portions with the slotted openings,
wherein the panel is permitted to swing away from the stationary part about the second bars of the first and second pairs of bars.

12. The vehicle panel mounting assembly of claim 11, wherein rotation of the actuator selectively unlatches the mounting members of the first and second mounts that are associated with first bars of the first and second pairs of bars.

13. The vehicle panel mounting assembly of claim 1, wherein
the first mount includes a plurality of spaced apart mounting members each configured to be mounted on the panel and including a circular recess connected to a slotted opening;
the second mount including a plurality of spaced apart mounting members each configured to be mounted on the stationary part and including a circular recess connected to a slotted opening; and
wherein the mounting assembly further comprises linkage interconnecting the first mount and the second mount, the linkage including first and second pairs of bars and at least one support arm interconnecting the bars of the first and second pairs of bars, each bar of the first and second pairs of bars having first and second spaced apart cams dimensioned to be received into the circular recess through the slotted openings in a first orientation and prohibited from movement through the slotted openings of the mounting members in a second orientation.

14. A panel mounting system, comprising:
a panel mount including a plurality of panel mount latches configured to be mounted on a panel;
a stationary part mount including a plurality of stationary part mount latches configured to be mounted on a stationary part;
linkage interconnecting the panel mount and the stationary part mount, the linkage including first and second pairs of bars defining first and second pivot axes and at least one swing arm interconnecting the bars of the first and second pairs of bars;
an actuator configured to selectively latch two of the panel mount latches about the second pair of bars to form a first pair of movable pivots and selectively latch two of the stationary part mount latches about the first pair of bars to form a first pair of fixed pivots, and configured to selectively unlatch the remaining mount latches,
wherein the panel is permitted to swing away from the stationary part about the fixed pivots.

15. The panel mounting system of claim 14, wherein each latch includes a first latch interface for ensuring latch closure and a second latch interface that releases the latch.

16. The panel mounting system of claim 14, wherein the actuator is configured to:
selectively latch a different two of the panel mount latches about the first pair of vertical bars to form a second pair of movable pivots and selectively latch a different two of the stationary part mount latches about the second pair of vertical bars to form a second pair of fixed pivots; and
selectively unlatch the remaining mount latches,
wherein the panel is permitted to swing away from the stationary part about the second pair of fixed pivots.

17. A vehicle, comprising:
a first fairing supported by a vehicle frame;
a second fairing positioned adjacent the first fairing; and
a second fairing mounting system including a first mount mounted on the second fairing, a second mount mounted to the vehicle frame, and at least one swing arm interconnecting the first mount and the second mount, wherein the second fairing mounting system is configured to support the second fairing in a stationary position with respect to the first fairing, to permit movement of the second fairing simultaneously in both a forwardly direction and a laterally outwardly direction with respect to the first fairing, and to permit movement of the second fairing simultaneously in both a rearwardly direction and a laterally outwardly direction with respect to the first fairing, and an actuator having a fairing latched position and first and second fairing unlatched positions.

18. The vehicle of claim 17, wherein the second fairing mounting system includes first and second pairs of vertical bars that define first and second sets of pivots, the mounting system configured to: (1) permit movement of the second fairing with respect to the vehicle frame about the first pivot axes for movement forwardly in a longitudinal direction of the vehicle frame and outwardly in a lateral direction of the vehicle frame; or (2) permit movement of the second fairing with respect to the vehicle frame about the second pivot axes for movement rearwardly in a longitudinal direction of the vehicle frame and outwardly in a lateral direction of the vehicle frame, wherein the first mount includes a set of four first mount latches, each first mount latch mounted to the second fairing and configured to: (1) latch onto a respective one of the vertical bars and pivot relative to the respective one of the vertical bars; and (2) unlatch from the respective one of the vertical bars so as to be separable from the respective one of the vertical bars; and wherein the second mount includes a set of four second mount latches, each second mount latch configured to be mounted to the stationary part and configured to: (1) latch onto a respective one of the vertical bars and pivot relative to the respective one of the vertical bars; and (2) unlatch from the respective one of the vertical bars so as to be separable from the respective one of the second bars.

19. The vehicle of claim 17, wherein the second fairing mounting system includes means for permitting movement of the second fairing about a first pair of fixed pivots in a first operational state and for permitting movement of the second fairing about a second pair of fixed pivots in a second operational state.

20. The vehicle of claim 19, wherein the first and second fairing unlatched positions correspond to the first and second operational states, respectively, such that the second fairing is able to pivot about the first pair of fixed pivots or able to pivot about the second pair of fixed pivots dependent on the selected operational state.

* * * * *